United States Patent
Boesen

(10) Patent No.: US 10,344,960 B2
(45) Date of Patent: Jul. 9, 2019

(54) WIRELESS EARPIECE CONTROLLED MEDICAL HEADLIGHT

(71) Applicant: BRAGI GmbH, München (DE)

(72) Inventor: Peter Vincent Boesen, München (DE)

(*) Notice: Subject to any disclaimer, the term of this patent is extended or adjusted under 35 U.S.C. 154(b) by 0 days.

(21) Appl. No.: 16/135,958

(22) Filed: Sep. 19, 2018

(65) Prior Publication Data

US 2019/0086066 A1    Mar. 21, 2019

Related U.S. Application Data

(60) Provisional application No. 62/560,383, filed on Sep. 19, 2017.

(51) Int. Cl.
*F21V 23/04* (2006.01)
*H04R 1/10* (2006.01)
(Continued)

(52) U.S. Cl.
CPC ............. *F21V 23/045* (2013.01); *F21V 7/06* (2013.01); *G06F 3/017* (2013.01); *G06F 3/02* (2013.01);
(Continued)

(58) Field of Classification Search
CPC ........ H05B 57/02; H05B 33/08; H05B 1/385; H05B 2001/3866; H05B 2001/3872;
(Continued)

(56) References Cited

U.S. PATENT DOCUMENTS 2,325,590 A    8/1943   Carlisle et al.
2,430,229 A    11/1947  Kelsey
(Continued)

FOREIGN PATENT DOCUMENTS

CN    204244472 U    4/2015
CN    104683519 A    6/2015
(Continued)

OTHER PUBLICATIONS

Stretchgoal—It's Your Dash (Feb. 14, 2014), 14 pages.
(Continued)

*Primary Examiner* — Jimmy T Vu
(74) *Attorney, Agent, or Firm* — Goodhue, Coleman & Owens, P.C.

(57) ABSTRACT

A wireless earpiece controlled wearable headlight, method and system includes a configurable headband for fitting to a head of a user and a light source operably attached to the headband. A logic controller is attached to the headband and operably connected to the light source for automated control of light source. A wireless transceiver is also attached to the headband and operatively connected to the logic controller. A wireless earpiece includes a processor, a second wireless transceiver operatively connected to the processor, and at least one sensor operatively connected to the processor. The wireless earpiece is worn in-ear by the user and the at least one sensor receives an input from the user at the wireless earpiece. The user input to the wireless earpiece is communicated to and processed by the logic controller for controlling the light source on the headband.

20 Claims, 5 Drawing Sheets

(51) Int. Cl.
*F21V 7/06* (2006.01)
*H04B 1/3827* (2015.01)
*G06F 3/16* (2006.01)
*G06F 3/01* (2006.01)
*H04N 5/225* (2006.01)
*G06F 3/02* (2006.01)

(52) U.S. Cl.
CPC .......... *G06F 3/167* (2013.01); *H04B 1/385* (2013.01); *H04N 5/2256* (2013.01); *H04R 1/1016* (2013.01); *H04B 2001/3866* (2013.01); *H04B 2001/3872* (2013.01); *H04R 2420/07* (2013.01)

(58) Field of Classification Search
CPC .......... H04W 4/00; F21V 23/045; F21V 7/06; G06F 3/017; G06F 3/02; G06F 3/167; H04N 5/2256; H04R 1/1016; H04R 2420/07
See application file for complete search history.

(56) References Cited

U.S. PATENT DOCUMENTS

| | | | |
|---|---|---|---|
| 3,047,089 | A | 7/1962 | Zwislocki |
| D208,784 | S | 10/1967 | Sanzone |
| 3,586,794 | A | 6/1971 | Michaelis |
| 3,696,377 | A | 10/1972 | Wall |
| 3,934,100 | A | 1/1976 | Harada |
| 3,983,336 | A | 9/1976 | Malek et al. |
| 4,069,400 | A | 1/1978 | Johanson et al. |
| 4,150,262 | A | 4/1979 | Ono |
| 4,334,315 | A | 6/1982 | Ono et al. |
| D266,271 | S | 9/1982 | Johanson et al. |
| 4,375,016 | A | 2/1983 | Harada |
| 4,588,867 | A | 5/1986 | Konomi |
| 4,617,429 | A | 10/1986 | Bellafiore |
| 4,654,883 | A | 3/1987 | Iwata |
| 4,682,180 | A | 7/1987 | Gans |
| 4,791,673 | A | 12/1988 | Schreiber |
| 4,852,177 | A | 7/1989 | Ambrose |
| 4,865,044 | A | 9/1989 | Wallace et al. |
| 4,984,277 | A | 1/1991 | Bisgaard et al. |
| 5,008,943 | A | 4/1991 | Arndt et al. |
| 5,036,479 | A | 7/1991 | Prednis et al. |
| 5,123,016 | A | 6/1992 | Muller et al. |
| 5,185,802 | A | 2/1993 | Stanton |
| 5,191,602 | A | 3/1993 | Regen et al. |
| 5,201,007 | A | 4/1993 | Ward et al. |
| 5,201,008 | A | 4/1993 | Arndt et al. |
| D340,286 | S | 10/1993 | Seo |
| 5,280,524 | A | 1/1994 | Norris |
| 5,295,193 | A | 3/1994 | Ono |
| 5,298,692 | A | 3/1994 | Ikeda et al. |
| 5,343,532 | A | 8/1994 | Shugart |
| 5,347,584 | A | 9/1994 | Narisawa |
| 5,363,444 | A | 11/1994 | Norris |
| 5,444,786 | A | 8/1995 | Raviv |
| D367,113 | S | 2/1996 | Weeks |
| 5,497,339 | A | 3/1996 | Bernard |
| 5,513,099 | A | 4/1996 | Schein |
| 5,596,587 | A | 1/1997 | Douglas et al. |
| 5,606,621 | A | 2/1997 | Reiter et al. |
| 5,613,222 | A | 3/1997 | Guenther |
| 5,654,530 | A | 8/1997 | Sauer et al. |
| 5,689,252 | A | 11/1997 | Ayanoglu et al. |
| 5,692,059 | A | 11/1997 | Kruger |
| 5,721,783 | A | 2/1998 | Anderson |
| 5,748,743 | A | 5/1998 | Weeks |
| 5,749,072 | A | 5/1998 | Mazurkiewicz et al. |
| 5,771,438 | A | 6/1998 | Palermo et al. |
| D397,796 | S | 9/1998 | Yabe et al. |
| 5,802,167 | A | 9/1998 | Hong |
| 5,844,996 | A | 12/1998 | Enzmann et al. |
| D410,008 | S | 5/1999 | Almqvist |
| 5,929,774 | A | 7/1999 | Charlton |
| 5,933,506 | A | 8/1999 | Aoki et al. |
| 5,949,896 | A | 9/1999 | Nageno et al. |
| 5,987,146 | A | 11/1999 | Pluvinage et al. |
| 6,021,207 | A | 2/2000 | Puthuff et al. |
| 6,054,989 | A | 4/2000 | Robertson et al. |
| 6,081,724 | A | 6/2000 | Wilson |
| 6,084,526 | A | 7/2000 | Blotky et al. |
| 6,094,492 | A | 7/2000 | Boesen |
| 6,111,569 | A | 8/2000 | Brusky et al. |
| 6,112,103 | A | 8/2000 | Puthuff |
| 6,157,727 | A | 12/2000 | Rueda |
| 6,167,039 | A | 12/2000 | Karlsson et al. |
| 6,181,801 | B1 | 1/2001 | Puthuff et al. |
| 6,185,152 | B1 | 2/2001 | Shen |
| 6,208,372 | B1 | 3/2001 | Barraclough |
| 6,230,029 | B1 | 5/2001 | Yegiazaryan et al. |
| 6,275,789 | B1 | 8/2001 | Moser et al. |
| 6,339,754 | B1 | 1/2002 | Flanagan et al. |
| D455,835 | S | 4/2002 | Anderson et al. |
| 6,408,081 | B1 | 6/2002 | Boesen |
| 6,424,820 | B1 | 7/2002 | Burdick et al. |
| D464,039 | S | 10/2002 | Boesen |
| 6,470,893 | B1 | 10/2002 | Boesen |
| D468,299 | S | 1/2003 | Boesen |
| D468,300 | S | 1/2003 | Boesen |
| 6,522,266 | B1 | 2/2003 | Soehren et al. |
| 6,542,721 | B2 | 4/2003 | Boesen |
| 6,560,468 | B1 | 5/2003 | Boesen |
| 6,563,301 | B2 | 5/2003 | Gventer |
| 6,654,721 | B2 | 11/2003 | Handelman |
| 6,664,713 | B2 | 12/2003 | Boesen |
| 6,681,176 | B2 | 1/2004 | Funk et al. |
| 6,690,807 | B1 | 2/2004 | Meyer |
| 6,694,180 | B1 | 2/2004 | Boesen |
| 6,718,043 | B1 | 4/2004 | Boesen |
| 6,721,657 | B2 | 4/2004 | Ford et al. |
| 6,738,485 | B1 | 5/2004 | Boesen |
| 6,748,095 | B1 | 6/2004 | Goss |
| 6,754,358 | B1 | 6/2004 | Boesen et al. |
| 6,784,873 | B1 | 8/2004 | Boesen et al. |
| 6,823,195 | B1 | 11/2004 | Boesen |
| 6,852,084 | B1 | 2/2005 | Boesen |
| 6,879,698 | B2 | 4/2005 | Boesen |
| 6,892,082 | B2 | 5/2005 | Boesen |
| 6,920,229 | B2 | 7/2005 | Boesen |
| 6,943,614 | B1 | 9/2005 | Kuei |
| 6,952,483 | B2 | 10/2005 | Boesen et al. |
| 6,987,986 | B2 | 1/2006 | Boesen |
| 7,010,137 | B1 | 3/2006 | Leedom et al. |
| 7,113,611 | B2 | 9/2006 | Leedom et al. |
| D532,520 | S | 11/2006 | Kampmeier et al. |
| 7,136,282 | B1 | 11/2006 | Rebeske |
| 7,203,331 | B2 | 4/2007 | Boesen |
| 7,209,569 | B2 | 4/2007 | Boesen |
| 7,215,790 | B2 | 5/2007 | Boesen et al. |
| D549,222 | S | 8/2007 | Huang |
| 7,279,887 | B1 | 10/2007 | King et al. |
| D554,756 | S | 11/2007 | Sjursen et al. |
| 7,312,699 | B2 * | 12/2007 | Chornenky .......... H04R 1/1041 340/12.5 |
| 7,403,629 | B1 | 7/2008 | Aceti et al. |
| D579,006 | S | 10/2008 | Kim et al. |
| 7,463,902 | B2 | 12/2008 | Boesen |
| 7,508,411 | B2 | 3/2009 | Boesen |
| 7,532,901 | B1 | 5/2009 | LaFranchise et al. |
| D601,134 | S | 9/2009 | Elabidi et al. |
| 7,668,652 | B2 | 2/2010 | Spencer et al. |
| 7,825,626 | B2 | 11/2010 | Kozisek |
| 7,859,469 | B1 | 12/2010 | Rosener et al. |
| 7,965,855 | B1 | 6/2011 | Ham |
| 7,979,035 | B2 | 7/2011 | Griffin et al. |
| 7,983,628 | B2 | 7/2011 | Boesen |
| D647,491 | S | 10/2011 | Chen et al. |
| 8,095,188 | B2 | 1/2012 | Shi |
| 8,108,143 | B1 | 1/2012 | Tester |
| 8,140,357 | B1 | 3/2012 | Boesen |
| 8,238,967 | B1 | 8/2012 | Arnold et al. |
| 8,253,589 | B2 | 8/2012 | Grimm et al. |

(56) References Cited

U.S. PATENT DOCUMENTS

| | | |
|---|---|---|
| D666,581 S | 9/2012 | Perez |
| 8,300,864 B2 | 10/2012 | Müllenborn et al. |
| 8,406,448 B2 | 3/2013 | Lin et al. |
| 8,430,817 B1 | 4/2013 | Al-Ali et al. |
| 8,436,780 B2 | 5/2013 | Schantz et al. |
| D687,021 S | 7/2013 | Yuen |
| 8,679,012 B1 | 3/2014 | Kayyali |
| 8,719,877 B2 | 5/2014 | VonDoenhoff et al. |
| 8,774,434 B2 | 7/2014 | Zhao et al. |
| 8,831,266 B1 | 9/2014 | Huang |
| 8,879,748 B2 * | 11/2014 | Alam .................. H04L 12/00 381/81 |
| 8,891,800 B1 | 11/2014 | Shaffer |
| 8,994,498 B2 | 3/2015 | Agrafioti et al. |
| D728,107 S | 4/2015 | Martin et al. |
| 9,013,145 B2 | 4/2015 | Castillo et al. |
| 9,037,125 B1 | 5/2015 | Kadous |
| D733,103 S | 6/2015 | Jeong et al. |
| 9,081,944 B2 | 7/2015 | Camacho et al. |
| 9,229,227 B2 | 1/2016 | Border et al. |
| 9,317,241 B2 | 4/2016 | Tranchina |
| 9,461,403 B2 | 10/2016 | Gao et al. |
| 9,510,159 B1 | 11/2016 | Cuddihy et al. |
| D773,439 S | 12/2016 | Walker |
| D775,158 S | 12/2016 | Dong et al. |
| 9,524,631 B1 | 12/2016 | Agrawal et al. |
| D777,710 S | 1/2017 | Palmborg et al. |
| 9,544,689 B2 | 1/2017 | Fisher et al. |
| D788,079 S | 5/2017 | Son et al. |
| 9,684,778 B2 | 6/2017 | Tharappel et al. |
| 9,711,062 B2 | 7/2017 | Ellis et al. |
| 9,729,979 B2 | 8/2017 | Özden |
| 9,767,709 B2 | 9/2017 | Ellis |
| 9,818,005 B2 | 11/2017 | Yeager et al. |
| 9,821,767 B2 | 11/2017 | Nixon |
| 9,848,257 B2 | 12/2017 | Ambrose et al. |
| 2001/0005197 A1 | 6/2001 | Mishra et al. |
| 2001/0027121 A1 | 10/2001 | Boesen |
| 2001/0043707 A1 | 11/2001 | Leedom |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0002705 A1 | 1/2003 | Boesen |
| 2003/0065504 A1 | 4/2003 | Kraemer et al. |
| 2003/0079165 A1 | 4/2003 | Ffrench et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0102931 A1 | 5/2004 | Ellis et al. |
| 2004/0160511 A1 | 8/2004 | Boesen |
| 2005/0017842 A1 | 1/2005 | Dematteo |
| 2005/0043056 A1 | 2/2005 | Boesen |
| 2005/0094839 A1 | 5/2005 | Gwee |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0197063 A1 | 9/2005 | White |
| 2005/0212911 A1 | 9/2005 | Marvit et al. |
| 2005/0251455 A1 | 11/2005 | Boesen |
| 2005/0266876 A1 | 12/2005 | Boesen |
| 2006/0029246 A1 | 2/2006 | Boesen |
| 2006/0073787 A1 | 4/2006 | Lair et al. |
| 2006/0074671 A1 | 4/2006 | Farmaner et al. |
| 2006/0074808 A1 | 4/2006 | Boesen |
| 2006/0166715 A1 | 7/2006 | Engelen et al. |
| 2006/0166716 A1 | 7/2006 | Seshadri et al. |
| 2006/0220915 A1 | 10/2006 | Bauer |
| 2006/0258412 A1 | 11/2006 | Liu |
| 2006/0276987 A1 | 12/2006 | Bolander et al. |
| 2007/0102009 A1 | 5/2007 | Wong et al. |
| 2007/0239225 A1 | 10/2007 | Saringer |
| 2007/0242834 A1 | 10/2007 | Coutinho et al. |
| 2007/0247800 A1 | 10/2007 | Smith et al. |
| 2007/0269785 A1 | 11/2007 | Yamanoi |
| 2008/0013747 A1 | 1/2008 | Tran |
| 2008/0076972 A1 | 3/2008 | Dorogusker et al. |
| 2008/0090622 A1 | 4/2008 | Kim et al. |
| 2008/0102424 A1 | 5/2008 | Holljes |
| 2008/0146890 A1 | 6/2008 | LeBoeuf et al. |
| 2008/0187163 A1 | 8/2008 | Goldstein et al. |
| 2008/0215239 A1 | 9/2008 | Lee |
| 2008/0253583 A1 | 10/2008 | Goldstein et al. |
| 2008/0254780 A1 | 10/2008 | Kuhl et al. |
| 2008/0255430 A1 | 10/2008 | Alexandersson et al. |
| 2008/0298606 A1 | 12/2008 | Johnson et al. |
| 2008/0318518 A1 | 12/2008 | Coutinho et al. |
| 2009/0003620 A1 | 1/2009 | McKillop et al. |
| 2009/0008275 A1 | 1/2009 | Ferrari et al. |
| 2009/0017881 A1 | 1/2009 | Madrigal |
| 2009/0041313 A1 | 2/2009 | Brown |
| 2009/0073070 A1 | 3/2009 | Rofougaran |
| 2009/0097689 A1 | 4/2009 | Prest et al. |
| 2009/0105548 A1 | 4/2009 | Bart |
| 2009/0154739 A1 | 6/2009 | Zellner |
| 2009/0182913 A1 | 7/2009 | Rosenblatt et al. |
| 2009/0191920 A1 | 7/2009 | Regen et al. |
| 2009/0226017 A1 | 9/2009 | Abolfathi et al. |
| 2009/0240947 A1 | 9/2009 | Goyal et al. |
| 2009/0245559 A1 | 10/2009 | Boltyenkov et al. |
| 2009/0261114 A1 | 10/2009 | McGuire et al. |
| 2009/0296968 A1 | 12/2009 | Wu et al. |
| 2009/0299215 A1 | 12/2009 | Zhang |
| 2009/0303073 A1 | 12/2009 | Gilling et al. |
| 2009/0304210 A1 | 12/2009 | Weisman |
| 2010/0007805 A1 | 1/2010 | Vitito |
| 2010/0033313 A1 | 2/2010 | Keady et al. |
| 2010/0075631 A1 | 3/2010 | Black et al. |
| 2010/0106356 A1 | 4/2010 | Trepagnier et al. |
| 2010/0166206 A1 | 7/2010 | Macours |
| 2010/0168075 A1 | 7/2010 | Dahlstrom et al. |
| 2010/0203831 A1 | 8/2010 | Muth |
| 2010/0207651 A1 | 8/2010 | Suto |
| 2010/0210212 A1 | 8/2010 | Sato |
| 2010/0285771 A1 | 11/2010 | Peabody |
| 2010/0290636 A1 | 11/2010 | Mao et al. |
| 2010/0320961 A1 | 12/2010 | Castillo et al. |
| 2011/0018731 A1 | 1/2011 | Linsky et al. |
| 2011/0102276 A1 | 5/2011 | Jimenez et al. |
| 2011/0103609 A1 | 5/2011 | Pelland et al. |
| 2011/0137141 A1 | 6/2011 | Razoumov et al. |
| 2011/0140844 A1 | 6/2011 | McGuire et al. |
| 2011/0140956 A1 | 6/2011 | Henry et al. |
| 2011/0239497 A1 | 10/2011 | McGuire et al. |
| 2011/0286615 A1 | 11/2011 | Olodort et al. |
| 2011/0293105 A1 | 12/2011 | Arie et al. |
| 2012/0057740 A1 | 3/2012 | Rosal |
| 2012/0155670 A1 | 6/2012 | Rutschman |
| 2012/0159617 A1 | 6/2012 | Wu et al. |
| 2012/0162891 A1 | 6/2012 | Tranchina et al. |
| 2012/0163626 A1 | 6/2012 | Booij et al. |
| 2012/0197737 A1 | 8/2012 | LeBoeuf et al. |
| 2012/0235883 A1 | 9/2012 | Border et al. |
| 2012/0309453 A1 | 12/2012 | Maguire |
| 2013/0106454 A1 | 5/2013 | Liu et al. |
| 2013/0154826 A1 | 6/2013 | Ratajczyk |
| 2013/0178967 A1 | 7/2013 | Mentz |
| 2013/0200999 A1 | 8/2013 | Spodak et al. |
| 2013/0204617 A1 | 8/2013 | Kuo et al. |
| 2013/0293494 A1 | 11/2013 | Reshef |
| 2013/0316642 A1 | 11/2013 | Newham |
| 2013/0343585 A1 | 12/2013 | Bennett et al. |
| 2013/0346168 A1 | 12/2013 | Zhou et al. |
| 2014/0002357 A1 | 1/2014 | Pombo et al. |
| 2014/0004912 A1 | 1/2014 | Rajakarunanayake |

(56) References Cited

U.S. PATENT DOCUMENTS

| | | |
|---|---|---|
| 2014/0010391 A1 | 1/2014 | Ek et al. |
| 2014/0020089 A1 | 1/2014 | Perini, II |
| 2014/0072136 A1 | 3/2014 | Tenenbaum et al. |
| 2014/0072146 A1 | 3/2014 | Itkin et al. |
| 2014/0073429 A1 | 3/2014 | Meneses et al. |
| 2014/0079257 A1 | 3/2014 | Ruwe et al. |
| 2014/0106677 A1 | 4/2014 | Altman |
| 2014/0122116 A1 | 5/2014 | Smythe |
| 2014/0146973 A1 | 5/2014 | Liu et al. |
| 2014/0153768 A1 | 6/2014 | Hagen et al. |
| 2014/0163771 A1 | 6/2014 | Demeniuk |
| 2014/0185828 A1 | 7/2014 | Helbling |
| 2014/0219467 A1 | 8/2014 | Kurtz |
| 2014/0222462 A1 | 8/2014 | Shakil et al. |
| 2014/0235169 A1 | 8/2014 | Parkinson et al. |
| 2014/0237518 A1 | 8/2014 | Liu |
| 2014/0270227 A1 | 9/2014 | Swanson |
| 2014/0270271 A1 | 9/2014 | Dehe et al. |
| 2014/0276227 A1 | 9/2014 | Pérez |
| 2014/0279889 A1 | 9/2014 | Luna |
| 2014/0310595 A1 | 10/2014 | Acharya et al. |
| 2014/0321682 A1 | 10/2014 | Kofod-Hansen et al. |
| 2014/0335908 A1 | 11/2014 | Krisch et al. |
| 2014/0348367 A1 | 11/2014 | Vavrus et al. |
| 2015/0028996 A1 | 1/2015 | Agrafioti et al. |
| 2015/0035643 A1 | 2/2015 | Kursun |
| 2015/0036835 A1 | 2/2015 | Chen |
| 2015/0056584 A1 | 2/2015 | Boulware et al. |
| 2015/0110587 A1 | 4/2015 | Hori |
| 2015/0124058 A1 | 5/2015 | Okpeva et al. |
| 2015/0148989 A1 | 5/2015 | Cooper et al. |
| 2015/0181356 A1 | 6/2015 | Krystek et al. |
| 2015/0230022 A1 | 8/2015 | Sakai et al. |
| 2015/0245127 A1 | 8/2015 | Shaffer |
| 2015/0256949 A1 | 9/2015 | Vanpoucke et al. |
| 2015/0264472 A1 | 9/2015 | Aase |
| 2015/0264501 A1 | 9/2015 | Hu et al. |
| 2015/0310720 A1 | 10/2015 | Gettings et al. |
| 2015/0317565 A1 | 11/2015 | Li et al. |
| 2015/0358751 A1 | 12/2015 | Deng et al. |
| 2015/0359436 A1 | 12/2015 | Shim et al. |
| 2015/0364058 A1 | 12/2015 | Lagree |
| 2015/0373467 A1 | 12/2015 | Gelter |
| 2015/0373474 A1 | 12/2015 | Kraft et al. |
| 2015/0379251 A1 | 12/2015 | Komaki |
| 2016/0033280 A1 | 2/2016 | Moore et al. |
| 2016/0034249 A1 | 2/2016 | Lee et al. |
| 2016/0071526 A1 | 3/2016 | Wingate et al. |
| 2016/0072558 A1 | 3/2016 | Hirsch et al. |
| 2016/0073189 A1 | 3/2016 | Lindén et al. |
| 2016/0094550 A1 | 3/2016 | Bradley et al. |
| 2016/0100262 A1 | 4/2016 | Inagaki |
| 2016/0119737 A1 | 4/2016 | Mehnert et al. |
| 2016/0124707 A1 | 5/2016 | Ermilov et al. |
| 2016/0125892 A1 | 5/2016 | Bowen et al. |
| 2016/0140870 A1 | 5/2016 | Connor |
| 2016/0142818 A1 | 5/2016 | Park |
| 2016/0162259 A1 | 6/2016 | Zhao et al. |
| 2016/0209691 A1 | 7/2016 | Yang et al. |
| 2016/0226713 A1 | 8/2016 | Dellinger et al. |
| 2016/0253994 A1 | 9/2016 | Panchapagesan et al. |
| 2016/0324478 A1 | 11/2016 | Goldstein |
| 2016/0352818 A1 | 12/2016 | Han et al. |
| 2016/0353196 A1 | 12/2016 | Baker et al. |
| 2016/0360350 A1 | 12/2016 | Watson et al. |
| 2017/0021257 A1 | 1/2017 | Gilbert |
| 2017/0046503 A1 | 2/2017 | Cho et al. |
| 2017/0059152 A1 | 3/2017 | Hirsch et al. |
| 2017/0060262 A1 | 3/2017 | Hviid et al. |
| 2017/0060269 A1 | 3/2017 | Förstner et al. |
| 2017/0061751 A1 | 3/2017 | Loermann et al. |
| 2017/0061817 A1 | 3/2017 | May |
| 2017/0062913 A1 | 3/2017 | Hirsch et al. |
| 2017/0064426 A1 | 3/2017 | Hviid |
| 2017/0064428 A1 | 3/2017 | Hirsch |
| 2017/0064432 A1 | 3/2017 | Hviid et al. |
| 2017/0064437 A1 | 3/2017 | Hviid et al. |
| 2017/0065228 A1 | 3/2017 | Hirano |
| 2017/0078780 A1 | 3/2017 | Qian et al. |
| 2017/0078785 A1 | 3/2017 | Qian et al. |
| 2017/0096065 A1 | 4/2017 | Katsuno et al. |
| 2017/0100277 A1 | 4/2017 | Ke |
| 2017/0108918 A1 | 4/2017 | Boesen |
| 2017/0109131 A1 | 4/2017 | Boesen |
| 2017/0110124 A1 | 4/2017 | Boesen et al. |
| 2017/0110899 A1 | 4/2017 | Boesen |
| 2017/0111723 A1 | 4/2017 | Boesen |
| 2017/0111725 A1 | 4/2017 | Boesen et al. |
| 2017/0111726 A1 | 4/2017 | Martin et al. |
| 2017/0111740 A1 | 4/2017 | Hviid et al. |
| 2017/0119318 A1 | 5/2017 | Shay et al. |
| 2017/0127168 A1 | 5/2017 | Briggs et al. |
| 2017/0131094 A1 | 5/2017 | Kulik |
| 2017/0142511 A1 | 5/2017 | Dennis |
| 2017/0146801 A1 | 5/2017 | Stempora |
| 2017/0150920 A1 | 6/2017 | Chang et al. |
| 2017/0151085 A1 | 6/2017 | Chang et al. |
| 2017/0151447 A1 | 6/2017 | Boesen |
| 2017/0151668 A1 | 6/2017 | Boesen |
| 2017/0151918 A1 | 6/2017 | Boesen |
| 2017/0151930 A1 | 6/2017 | Boesen |
| 2017/0151957 A1 | 6/2017 | Boesen |
| 2017/0151959 A1 | 6/2017 | Boesen |
| 2017/0153114 A1 | 6/2017 | Boesen |
| 2017/0153636 A1 | 6/2017 | Boesen |
| 2017/0154532 A1 | 6/2017 | Boesen |
| 2017/0155985 A1 | 6/2017 | Boesen |
| 2017/0155992 A1 | 6/2017 | Perianu et al. |
| 2017/0155993 A1 | 6/2017 | Boesen |
| 2017/0155997 A1 | 6/2017 | Boesen |
| 2017/0155998 A1 | 6/2017 | Boesen |
| 2017/0156000 A1 | 6/2017 | Boesen |
| 2017/0164890 A1 | 6/2017 | Leip et al. |
| 2017/0178631 A1 | 6/2017 | Boesen |
| 2017/0180842 A1 | 6/2017 | Boesen |
| 2017/0180843 A1 | 6/2017 | Perianu et al. |
| 2017/0180897 A1 | 6/2017 | Perianu |
| 2017/0188127 A1 | 6/2017 | Perianu et al. |
| 2017/0188132 A1 | 6/2017 | Hirsch et al. |
| 2017/0193978 A1 | 7/2017 | Goldman |
| 2017/0195829 A1 | 7/2017 | Belverato et al. |
| 2017/0208393 A1 | 7/2017 | Boesen |
| 2017/0214987 A1 | 7/2017 | Boesen |
| 2017/0215016 A1 | 7/2017 | Dohmen et al. |
| 2017/0230752 A1 | 8/2017 | Dohmen et al. |
| 2017/0251295 A1 | 8/2017 | Pergament et al. |
| 2017/0251933 A1 | 9/2017 | Braun et al. |
| 2017/0257698 A1 | 9/2017 | Boesen et al. |
| 2017/0258329 A1 | 9/2017 | Marsh |
| 2017/0263236 A1 | 9/2017 | Boesen et al. |
| 2017/0263376 A1 | 9/2017 | Verschueren et al. |
| 2017/0266494 A1 | 9/2017 | Crankson et al. |
| 2017/0273622 A1 | 9/2017 | Boesen |
| 2017/0280257 A1 | 9/2017 | Gordon et al. |
| 2017/0297430 A1 | 10/2017 | Hori et al. |
| 2017/0301337 A1 | 10/2017 | Golani et al. |
| 2017/0361213 A1 | 12/2017 | Goslin et al. |
| 2017/0366233 A1 | 12/2017 | Hviid et al. |
| 2018/0007994 A1 | 1/2018 | Boesen et al. |
| 2018/0008194 A1 | 1/2018 | Boesen |
| 2018/0008198 A1 | 1/2018 | Kingscott |
| 2018/0009447 A1 | 1/2018 | Boesen et al. |
| 2018/0011006 A1 | 1/2018 | Kingscott |
| 2018/0011682 A1 | 1/2018 | Milevski et al. |
| 2018/0011994 A1 | 1/2018 | Boesen |
| 2018/0012228 A1 | 1/2018 | Milevski et al. |
| 2018/0013195 A1 | 1/2018 | Hviid et al. |
| 2018/0014102 A1 | 1/2018 | Hirsch et al. |
| 2018/0014103 A1 | 1/2018 | Martin et al. |
| 2018/0014104 A1 | 1/2018 | Boesen et al. |
| 2018/0014107 A1 | 1/2018 | Razouane et al. |
| 2018/0014108 A1 | 1/2018 | Dragicevic et al. |
| 2018/0014109 A1 | 1/2018 | Boesen |
| 2018/0014113 A1 | 1/2018 | Boesen |

(56) References Cited

U.S. PATENT DOCUMENTS

| | | | |
|---|---|---|---|
| 2018/0014140 | A1 | 1/2018 | Milevski et al. |
| 2018/0014436 | A1 | 1/2018 | Milevski |
| 2018/0034951 | A1 | 2/2018 | Boesen |
| 2018/0040093 | A1 | 2/2018 | Boesen |
| 2018/0042501 | A1 | 2/2018 | Adi et al. |
| 2018/0056903 | A1 | 3/2018 | Mullett |
| 2018/0063626 | A1 | 3/2018 | Pong et al. |

FOREIGN PATENT DOCUMENTS

| | | | |
|---|---|---|---|
| CN | 104837094 | A | 8/2015 |
| EP | 1469659 | A1 | 10/2004 |
| EP | 1017252 | A3 | 5/2006 |
| EP | 2903186 | A1 | 8/2015 |
| GB | 2074817 | | 4/1981 |
| GB | 2508226 | A | 5/2014 |
| JP | 06292195 | | 10/1998 |
| WO | 2008103925 | A1 | 8/2008 |
| WO | 2008113053 | A1 | 9/2008 |
| WO | 2007034371 | A3 | 11/2008 |
| WO | 2011001433 | A2 | 1/2011 |
| WO | 2012071127 | A1 | 5/2012 |
| WO | 2013134956 | A1 | 9/2013 |
| WO | 2014046602 | A1 | 3/2014 |
| WO | 2014043179 | A3 | 7/2014 |
| WO | 2015061633 | A2 | 4/2015 |
| WO | 2015110577 | A1 | 7/2015 |
| WO | 2015110587 | A1 | 7/2015 |
| WO | 2016032990 | A1 | 3/2016 |
| WO | 2016187869 | A1 | 12/2016 |

OTHER PUBLICATIONS

Stretchgoal—The Carrying Case for the Dash (Feb. 12, 2014), 9 pages.
Stretchgoal—Windows Phone Support (Feb. 17, 2014), 17 pages.
The Dash + The Charging Case & The BRAGI News (Feb. 21, 2014), 12 pages.
The Dash—A Word From Our Software, Mechanical and Acoustics Team + An Update (Mar. 11, 2014), 7 pages.
Update From BRAGI—$3,000,000—Yipee (Mar. 22, 2014), 11 pages.
Weisiger; "Conjugated Hyperbilirubinemia", Jan. 5, 2016, 2 pages.
Wertzner et al., "Analysis of fundamental frequency, jitter, shimmer and vocal intensity in children with phonological disorders", V. 71, n.5, 582-588, Sep./Oct. 2005; Brazilian Journal of Othrhinolaryngology.
Wikipedia, "Gamebook", https://en.wikipedia.org/wiki/Gamebook, Sep. 3, 2017, 5 pages.
Wikipedia, "Kinect", "https://en.wikipedia.org/wiki/Kinect", 18 pages, (Sep. 9, 2017).
Wikipedia, "Wii Balance Board", "https://en.wikipedia.org/wiki/Wii_Balance_Board", 3 pages, (Jul. 20, 2017).
Akkermans, "Acoustic Ear Recognition for Person Identification", Automatic Identification Advanced Technologies, 2005 pp. 219-223.
Alzahrani et al: "A Multi-Channel Opto-Electronic Sensor to Accurately Monitor Heart Rate against Motion Artefact during Exercise", Sensors, vol. 15, No. 10, Oct. 12, 2015, pp. 25681-25702, XPO55334602, DOI: 10.3390/s151025681 the whole document.
Announcing the $3,333,333 Stretch Goal (Feb. 24, 2014), 14 pages.
Ben Coxworth: "Graphene-based ink could enable low-cost, foldable electronics", "Journal of Physical Chemistry Letters", Northwestern University, (May 22, 2013), 7 pages.
Blain: "World's first graphene speaker already superior to Sennheiser MX400", htt://www.gizmag.com/graphene-speaker-beats-sennheiser-mx400/31660, (Apr. 15, 2014), 3 pages.
BMW, "BMW introduces BMW Connected—The personalized digital assistant", "http://bmwblog.com/2016/01/05/bmw-introduces-bmw-connected-the-personalized-digital-assistant", (Jan. 5, 2016), 14 pages.

Bragi Is on Facebook (2014), 51 pages.
Bragi Update—Arrival of Prototype Chassis Parts—More People—Awesomeness (May 13, 2014), 8 pages.
Bragi Update—Chinese New Year, Design Verification, Charging Case, More People, Timeline(Mar. 6, 2015), 18 pages.
Bragi Update—First Sleeves From Prototype Tool—Software Development Kit (Jun. 5, 2014), 8 pages.
Bragi Update—Let's Get Ready to Rumble, A Lot to Be Done Over Christmas (Dec. 22, 2014), 18 pages.
Bragi Update—Memories From April—Update on Progress (Sep. 16, 2014), 15 pages.
Bragi Update—Memories from May—Update on Progress—Sweet (Oct. 13, 2014), 16 pages.
BragiUpdate—Memories From One Month Before Kickstarter—Update on Progress (Jul. 10, 2014), 17 pages.
Bragi Update—Memories From the First Month of Kickstarter—Update on Progress (Aug. 1, 2014), 16 pages.
Bragi Update—Memories From the Second Month of Kickstarter—Update on Progress (Aug. 22, 2014), 16 pages.
Bragi Update—New People @BRAGI—Prototypes (Jun. 26, 2014), 9 pages.
Bragi Update—Office Tour, Tour to China, Tour to CES (Dec. 11, 2014), 14 pages.
Bragi Update—Status on Wireless, Bits and Pieces, Testing-Oh Yeah, Timeline(Apr. 24, 2015), 18 pages.
Bragi Update—The App Preview, The Charger, The SDK, BRAGI Funding and Chinese New Year (Feb. 11, 2015), 19 pages.
Bragi Update—What We Did Over Christmas, Las Vegas & CES (Jan. 19, 2014), 21 pages.
Bragi Update—Years of Development, Moments of Utter Joy and Finishing What We Started(Jun. 5, 2015), 21 pages.
Bragi Update—Alpha 5 and Back to China, Backer Day, On Track(May 16, 2015), 15 pages.
Bragi Update—Beta2 Production and Factory Line(Aug. 20, 2015), 16 pages.
Bragi Update—Certifications, Production, Ramping Up (Nov. 13, 2015), 15 pages.
Bragi Update—Developer Units Shipping and Status(Oct. 5, 2015), 20 pages.
Bragi Update—Developer Units Started Shipping and Status (Oct. 19, 2015), 20 pages.
Bragi Update—Developer Units, Investment, Story and Status(Nov. 2, 2015), 14 pages.
Bragi Update—Getting Close(Aug. 6, 2015), 20 pages.
Bragi Update—On Track, Design Verification, How It Works and What's Next(Jul. 15, 2015), 17 pages.
Bragi Update—On Track, On Track and Gems Overview (Jun. 24, 2015), 19 pages.
Bragi Update—Status on Wireless, Supply, Timeline and Open House@BRAGI(Apr. 1, 2015), 17 pages.
Bragi Update—Unpacking Video, Reviews on Audio Perform and Boy Are We Getting Close(Sep. 10, 2015), 15 pages.
Farr, Christina: "iPads in Every Hospital: Apple's Plan to Crack the $3 Trillion Health Care Sector", "https://www.fastcompany.com/3069060/artists-and-scientists-are-teaming-with-businesses-and-non-profits-on-gender-concerns" (Mar. 18, 2017), 9 pages.
Healthcare Risk Management Review, "Nuance updates computer-assisted physician documentation solution" (Oct. 20, 2016), 2 pages.
Hoffman, "How to Use Android Beam to Wirelessly Transfer Content Between Devices", (Feb. 22, 2013), 4 pages.
Hoyt et. al., "Lessons Learned from Implementation of Voice Recognition for Documentation in the Military Electronic Health Record System", The American Health Information Management Association (2017), 8 pages.
Hyundai Motor America, "Hyundai Motor Company Introduces a Health + Mobility Concept for Wellness in Mobility", Fountain Valley, Californa (2017), 3 pages.
International Search Report & Written Opinion, PCT/EP16/70245 (dated Nov. 16, 2016), 10 pages.
International Search Report & Written Opinion, PCT/EP2016/070231 (dated Nov. 18, 2016), 12 pages.

(56) References Cited

OTHER PUBLICATIONS

International Search Report & Written Opinion, PCT/EP2016/070247 (dated Nov. 18, 2016), 13 pages.
International Search Report & Written Opinion, PCT/EP2016/07216 (dated Oct. 18, 2016), 13 pages.
International Search Report and Written Opinion, PCT/EP2016/070228 (dated Jan. 9, 2017), 13 pages.
Jain A et al: "Score normalization in multimodal biometric systems", Pattern Recognition, Elsevier, GB, vol. 38, No. 12, Dec. 31, 2005, pp. 2270-2285, XPO27610849, ISSN: 0031-3203.
Last Push Before the Kickstarter Campaign Ends on Monday 4pm CET (Mar. 28, 2014), 7 pages.
Lovejoy: "Touch ID built into iPhone display one step closer as third-party company announces new tech", "http://9to5mac.com/2015/07/21/virtualhomebutton/" (Jul. 21, 2015), 14 pages.
Nemanja Paunovic et al, "A methodology for testing complex professional electronic systems", Serbian Journal of Electrical Engineering, vol. 9, No. 1, Feb. 1, 2012, pp. 71-80, XPO55317584, YU.
Nigel Whitfield: "Fake tape detectors, 'from the stands' footie and UGH? Internet of Things in my set-top box"; http://www.theregister.co.uk/2014/09/24/ibc_round_up_object_audio_dlna_iot/ (Sep. 24, 2014), 6 pages.
Nuance, "ING Netherlands Launches Voice Biometrics Payment System in the Mobile Banking App Powered by Nuance", "https://www.nuance.com/about-us/newsroom/press-releases/ing-netherlands-launches-nuance-voice-biometirics.html", 4 pages (Jul. 28, 2015).
Staab, Wayne J., et al., "A One-Size Disposable Hearing Aid is Introduced", The Hearing Journal 53(4):36-41) Apr. 2000, 4 pages.

\* cited by examiner

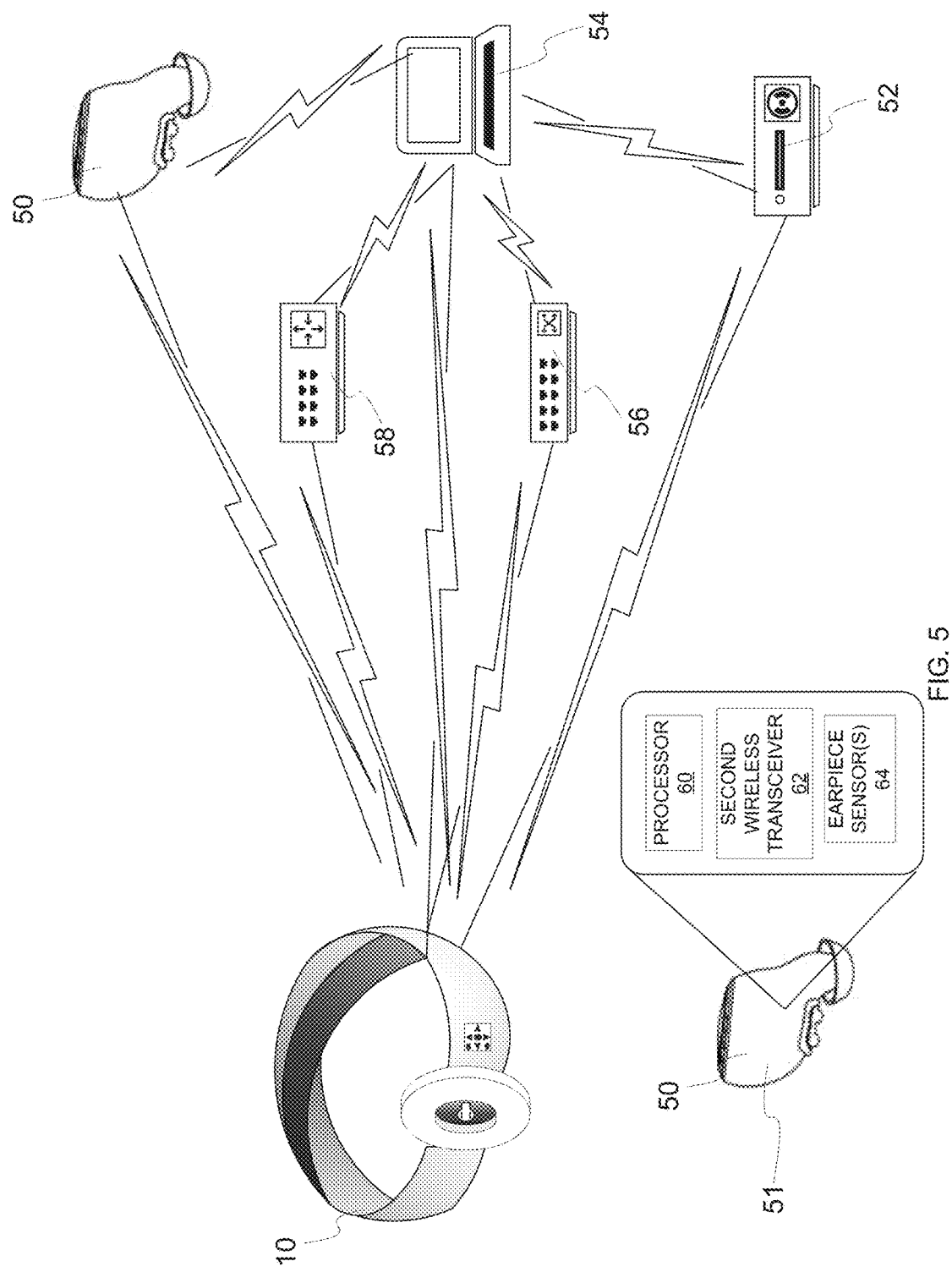

WIRELESS EARPIECE CONTROLLED MEDICAL HEADLIGHT

PRIORITY STATEMENT

This application claims priority to U.S. Provisional Patent Application 62/560,383, filed on Sep. 19, 2017, and entitled Wireless Medical Headlight, hereby incorporated by reference in its entirety.

FIELD OF INVENTION

The present invention relates to electronically controlled wearable devices. More particularly, but not exclusively, the present invention relates to a medical headlight controlled with wireless earpieces.

BACKGROUND

Wireless technology has continued to improve at an impressive rate the past decade. Wireless technology now allows for electronic devices as small as quarter-sized watches to have not just fully functional CPUs but sensors and touch interfaces for allowing user interaction and monitoring as well. One area where these new technologies have not been fully exploited is in the field of medical headlights. Medical headlights are used by surgeons and other medical professionals for illumination of cavities and other spaces that receive inadequate light. Operation and control of medical headlights is often performed manually. What is needed is a better way to wirelessly operate and control a medical headlight with wireless earpieces.

SUMMARY

Therefore, it is a primary object, feature, or advantage of the illustrative embodiments to improve over the state of the art.

It is a further object, feature, or advantage of the illustrative embodiments to provide an electronically controlled wireless headlight.

It is a still further object, feature, or advantage of the illustrative embodiments to provide a wireless headlight and wireless earpieces for controlling movement and illumination of the wireless headlight.

Another object, feature, or advantage is to provide a wireless headlight with the ability to capture images and video.

Yet another object, feature, or advantage is to wirelessly operate and control a medical headlight with wireless earpieces.

Another further object, feature, or advantage is to provide wireless earpieces that receive user input to actuate features of a wireless headlight.

In one illustrative aspect, a wireless earpiece controlled wearable headlight is disclosed. The wireless earpiece controlled wearable headlight includes a configurable headband for fitting to a head of a user and a light source operably attached to the headband. A logic controller is attached to the headband and operably connected to the light source for automated control of light source. A wireless transceiver is also attached to the headband and operatively connected to the logic controller. A wireless earpiece includes a processor, a second wireless transceiver operatively connected to the processor, and at least one sensor operatively connected to the processor. The wireless earpiece is worn in-ear by the user and the at least one sensor receives an input from the user at the wireless earpiece. The user input to the wireless earpiece is communicated to and processed by the logic controller for controlling the light source on the headband.

In another illustrative aspect, a wireless earpiece controlled wearable headlight system is disclosed. The system has a wireless headlight that includes a configurable headband for fitting to a head of a user, a light housing adjustably coupled to the headband and positioned proximate to a front side of the headband, a first processor disposed within the light housing, a first wireless transceiver operatively connected to the first processor, a light source disposed within the light housing, and at least one electronic actuator operably connected to the headband and the light housing to articulate the light housing relative to the headband and control direction of light emitted from the light source. The system also has a wireless earpiece that includes an earpiece housing configured to be worn in-ear by the user, a second processor disposed within the earpiece housing, a second wireless transceiver disposed with the earpiece housing and operatively connected to the second processor, and an earpiece sensor operatively connected to the processor. The earpiece sensor is configured for sensing an input by the user. The user input to the wireless earpiece is communicated to and processed by the first processor for controlling the light source on the headband.

Another illustrative aspect provides a method for utilizing a wireless headlight with wireless earpieces. The wireless headlight is associated with wireless earpieces. User input is received from the user utilizing one or more sensors of the wireless earpieces. The user input is communicated to the wireless headlight. An angle of illumination of a light source of the wireless headlight is adjusted in response to the user input. The brightness of the light source is adjusted utilizing the wireless headlight in response to the user input.

Another illustrative embodiment provides a system for illumination. The system includes a wireless headlight wearable on a head of a user including at least a battery, one or more light sources, a wireless transceiver, and one or more hinges controlling motion of the one or more light sources. The system also includes wireless earpieces associated with the wireless headlight including at least a battery, logic, a wireless transceiver and one or more sensors. The wireless earpieces send control signals to the wireless headlight through the wireless transceivers of the wireless earpieces and the wireless headlight. The wireless headlight utilizes the controls signals to control a direction of illumination of the light sources, the one or more lights sources utilized, and brightness of the one or more light sources.

One or more of the following features may also be utilized. The one or more lights sources may be changed in response to the user input. The light source may be focused on a target identified by the wireless headlight. The target may represent a selected image or a token identifiable by the wireless earpieces. The user input is one or more of an audio command, a tactile command or a gesture sensed by one or more sensors of the wireless earpieces. The one or more sensors of the wireless earpieces include at least a microphone, a touch sensor, and an accelerometer for sensing audio, tactile input, and head gestures, respectively.

One or more of the following features may be included. A camera may be operatively connected to the intelligent control system and may be positioned adjacent to the aperture on the light housing. Additionally, the camera may be configured for capturing video in front of the wireless headlight. The video recorded by the camera may be transmitted via the first wireless transceiver to the second wireless transceiver of the wireless earpiece for processing and storage by the processor of the wireless earpiece. A second hinge may be adjustably coupled to the light housing via a linkage. The illumination apparatus may be configured to provide electromagnetic radiation selected from the group consisting of visible light, infrared illumination, and ultraviolet illumination. The action performed by the user may include actions selected from the group consisting of a head motion, a voice command, and a hand gesture. The video recorded by the camera may include surgical video. The surgical video may further include annotation.

One or more of these and/or other objects, features, or advantages of the illustrative embodiments will become apparent from the specification and claims that follow. No single embodiment need provide each and every object, feature, or advantage. Different embodiments may have different objects, features, or advantages. Therefore, the illustrative embodiments are not to be limited to or by an object, feature, or advantage stated herein.

DESCRIPTION OF THE DRAWINGS

FIG. 5 illustrates the wireless headlight and its relationship to a wireless earpiece in accordance with an illustrative aspect.

DETAILED DESCRIPTION

Figure 1:
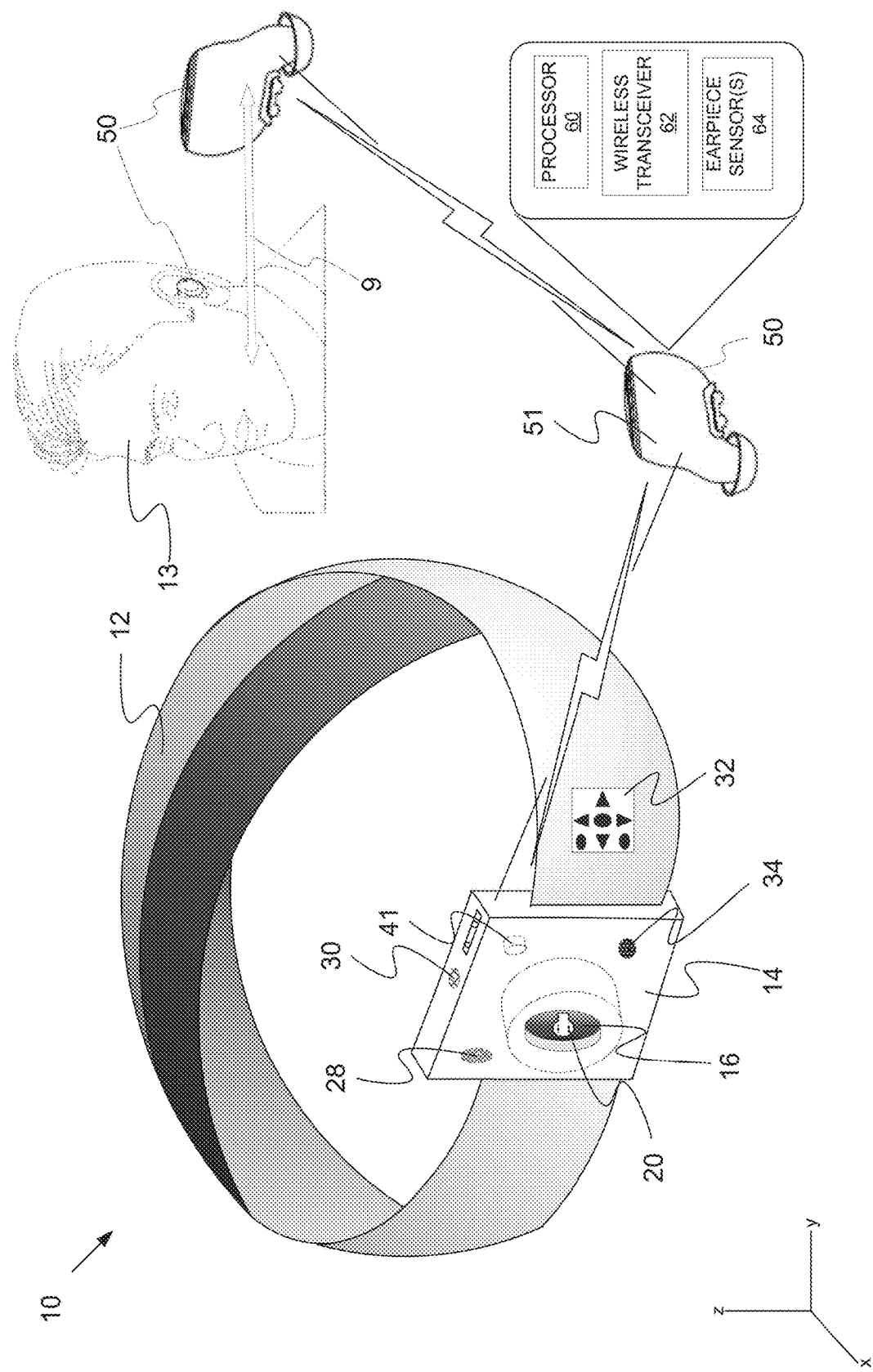
FIG. 1 illustrates a three-dimensional perspective of the wireless headlight in accordance with an illustrative aspect.

The illustrative aspects provide a system, method, and wireless headlight for utilizing with wireless earpieces. The wireless headlight may also capture data and transmit that data to an external electronic device, where it may be used for medical analyses or otherwise processed. In one aspect, the wireless headlight may be controlled by a user of wireless earpieces worn in-ear by the user. In one aspect, a connection is established between the wireless headlight and the wireless earpiece for controlling the wireless headlight utilizing user input to the wireless earpieces.

FIGS. 1-5 illustrate various aspects of an earpiece controlled wireless headlight, a wireless earpiece controlled wearable headlight system, and a method for utilizing a wireless headlight with earpieces. Although various aspects of the invention are illustrated throughout the figures and written description is referenced to certain figures, the written description making reference to one figure is to be applied to each figure and not limited to the referenced figure.

FIG. 1-5 illustrate a wireless headlight 10 in accordance with an illustrative aspect. In one aspect, the wireless headlight 10 includes a configurable headband 12 for fitting to the head of a user 13. The headband 12 may be an adjustable elastic band configured to fit around a user's head (e.g., forehead) and may include one or more additional bands for fitting around or over the top of the user's head or around the back of the user's head. Each additional band may include a strap or other securing mechanism for snuggly fitting the headband 12 to the user's head. The wireless headlight 10 may also be integrated as part of a hat, helmet, cap, or other head worn clothing or gear.

The wireless headlight 10 also includes a light housing 14 coupled to the headband 12 and positioned proximate to a front side of the headband 12. The light housing 14 may be composed of one or more plastics, one or more metals, one or more polymers, one or more non-metals, or a combination of materials having substantial deformation resistance to facilitate energy transfer if a sudden force is applied to the light housing 14.

The light housing 14 also includes an aperture 16 positioned coaxially with a light source 20 on a front side of the light housing 14. The aperture 16 may be sized to allow illumination 17 from the light source 20 to illuminate an area in front of the wireless headlight 10. The aperture 16 may also be configured for 180-degree illumination to the side and front of the user. In one aspect, the aperture 16 may allow light to be focused (e.g., wide beam, narrow beam) or directed. In one aspect, the aperture 16 may include one or more lenses (not shown). The lenses may be automatically or manually interchangeable based on the needs of the user. For example, the lenses may be pivotally connected and rotate within the light housing 14 to cover the aperture. In another example, the lenses may be snapped in utilizing tabs, hinges, prongs, an interference fit, or so forth.

In other aspects, the wireless headlight 10 may include multiple housings, and apertures for not only facilitating the user but also any other individuals proximate the user when wearing the wireless headlight 10. For example, the wireless headlight 10 may include two or three apertures. In one embodiment, each aperture may be associated with a different light source (e.g., white light, red light, blue light, ultraviolet, visible, infrared, and/or other types of electromagnetic radiation). The different light sources may be activated independently or as a group. In one aspect, an input 9 from user 13 to wireless earpieces 50 is communicated to and processed by a logic controller 42 within the light housing 14 for controlling operation of the light source 20, the brightness of the light source 20, and operation of one or more different light sources and their brightness.

Figure 2:
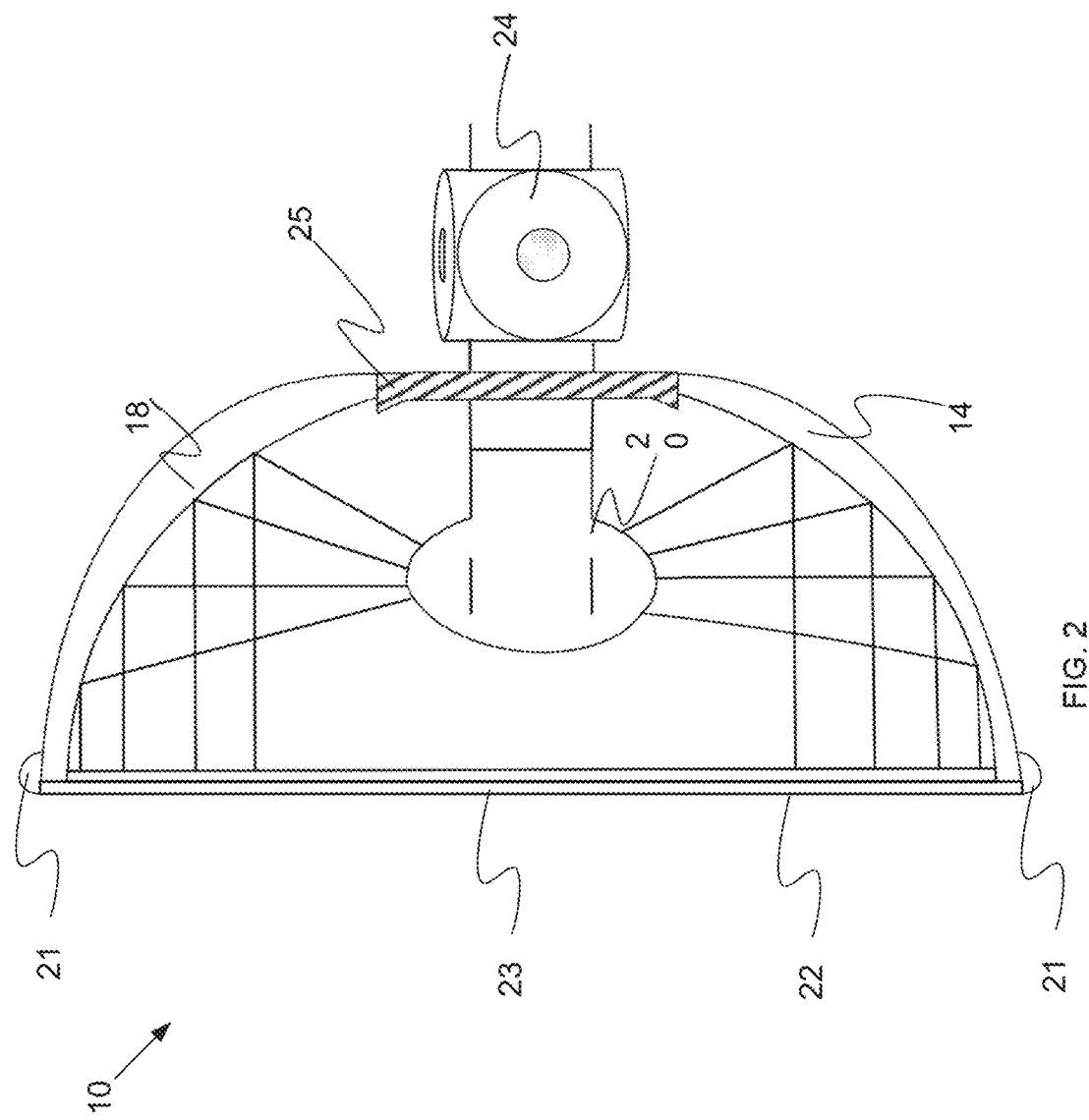
FIG. 2 illustrates the illumination apparatus and its relationship with the parabolic reflector in accordance with an illustrative aspect.
Figure 3:
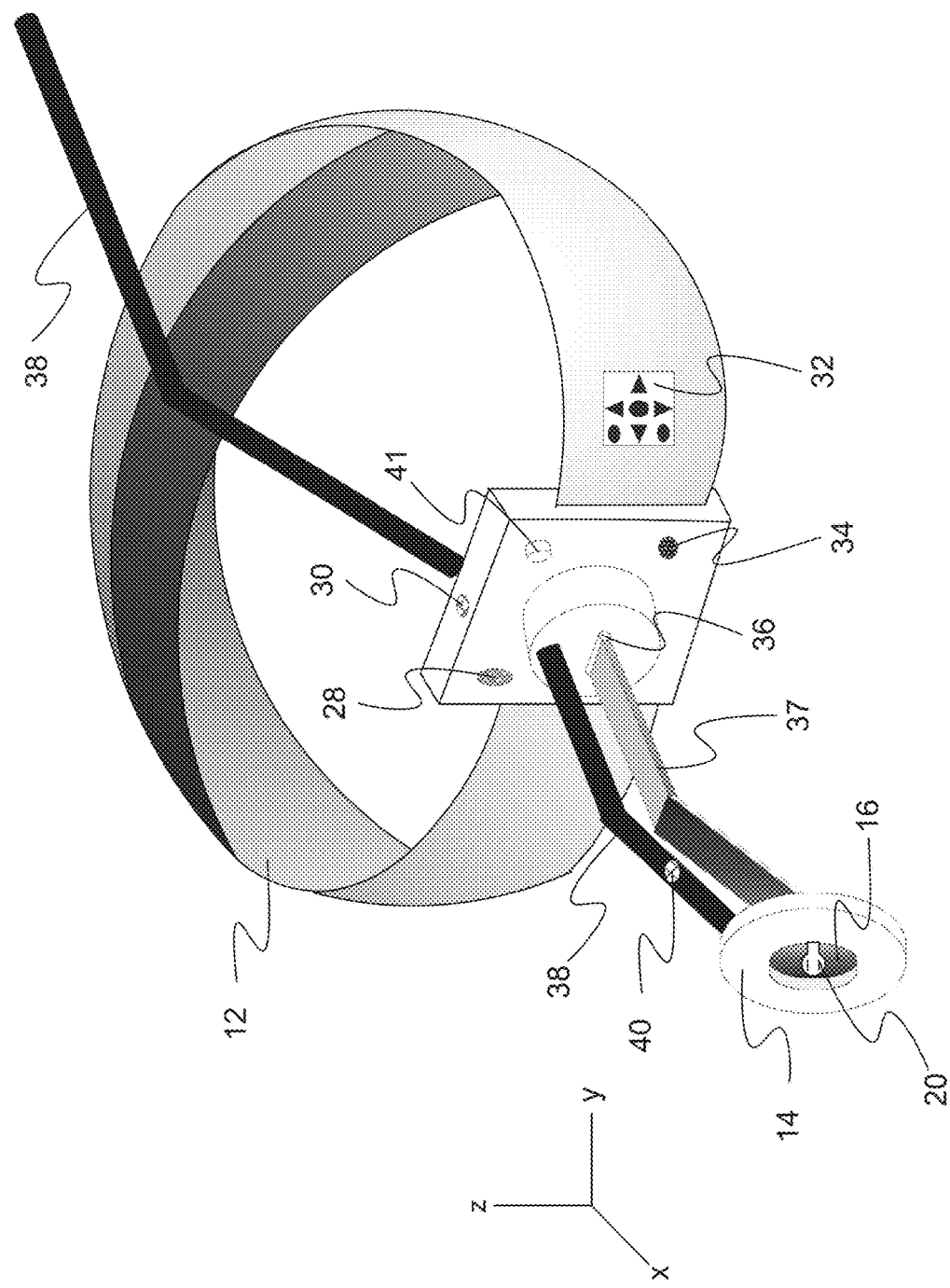
FIG. 3 illustrates the wireless headlight in accordance with another illustrative aspect.
Figure 4:
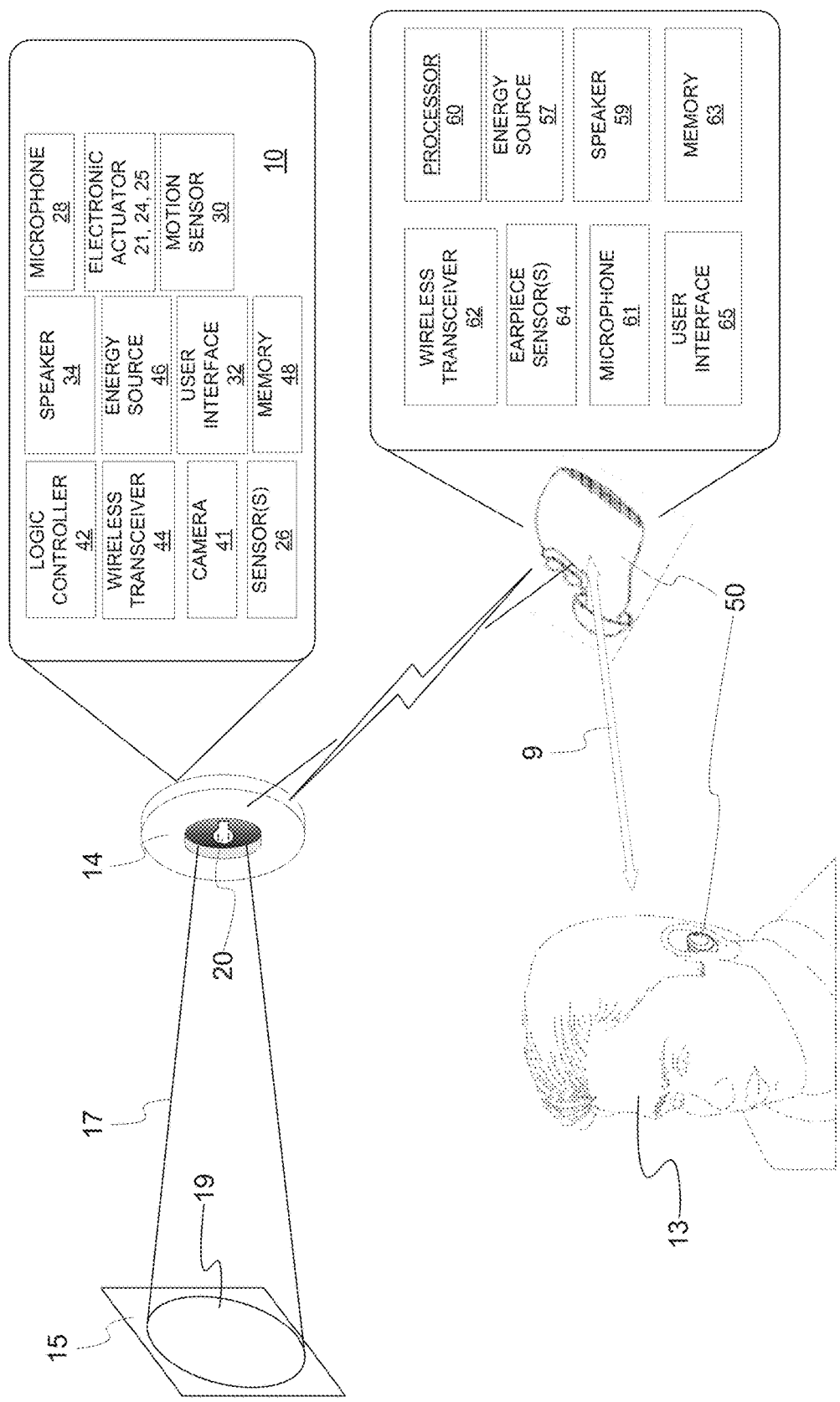
FIG. 4 illustrates a block diagram of the electrical and electromechanical components of the wireless headlight in accordance with an illustrative aspect.

FIG. 2 illustrates the inside of the light housing 14 in accordance with an illustrative embodiment. In one embodiment, a parabolic reflector 18 is disposed within the light housing 14. The parabolic reflector 18 may be positioned in the rear of the light housing 14 and proximate to the center of the light housing 14. The outer layer of the parabolic reflector 18 may be composed of any material suitable for specular reflection of visible light or other types of electromagnetic radiation (e.g., silver, aluminum with a Siloxane top coat, etc.)

In one embodiment, the parabolic reflector 18 may be a flexible material attached to an electronic actuator 25 adjacent to the light source 20 for allowing modification of its focal point and beam shaping. For example, the curvature of the parabolic reflector 18 may be decreased by actuating the electronic actuator 25 toward the light source 20 to decrease the total surface area of the parabolic reflector 18 to increase the "flood" of the wireless headlight 10. The curvature of the parabolic reflector 18 may also be increased by actuating the electronic actuator 25 away from the light source 20 to increase the total surface area of the parabolic reflector 18 to increase the "throw" of the wireless headlight 10, which may be useful for medical and rescue operations. In this manner, the focal point of the light source 20 can be changed depending on the distance of the target 15 from the light housing 14. In one aspect, an input 9 from user 13 to wireless earpieces 50 is communicated from wireless earpieces 50 to and processed by a logic controller 42 within the light housing 14 for controlling operation of electronic actuator 25.

In another embodiment, the parabolic reflector 18 may be composed of longitudinally overlapping sheets attached to an electronic actuator 25 adjacent to the light source 20 for allowing modification of its reflective properties such as its focal point 19. For example, the curvature of the parabolic reflector 18 may be decreased by actuating the electronic actuator 25 toward the light source 20 to decrease the total surface area of the overlapping sheets to increase the "flood" of the wireless headlight 10, which may be useful if the wireless headlight 10 is used in conditions where illuminating a larger/broader target is desired. The curvature of the parabolic reflector 18 may also be increased by actuating the electronic actuator 25 away from the light source 20 to increase the total surface area of the overlapping sheets to increase the "throw" of the wireless headlight 10, which may be useful for illuminating a smaller/narrower target. In another aspect, the parabolic reflector 18 may be formed of miniature reflective panels that are expanded or contracted based with the electronic actuator 25. The electronic actuator 25 can include, but is not limited to, piezo electric or micromechanical controls, hinges, and linkages that may revise the shape and configuration of the reflector 18 from parabolic to any number of pre-defined or user selected shapes. In one aspect, an input 9 from user 13 to wireless earpieces 50 is communicated from wireless earpieces 50 to and processed by a logic controller 42 within the light housing 14 for controlling operation of electronic actuator 25.

The light source 20 is disposed within the light housing 14 and positioned coaxially with the parabolic reflector 18 and proximate to the parabolic reflector's 18 focal point. The light source 20 may be one or more light emitting diodes. The light source 20 may be powered by an energy source 42, such as a battery, capacitor, solar cell, piezo electric generator, or other energy source. The light source may alternatively be one or more miniature halogen bulbs, light bulb, laser system, or other type of solid-state device. In one aspect, a heat sink may be operatively connected to the light source 20 for absorbing and dissipating heat. Any number of miniature radiators with radiation fins, such as air-cooled systems, or liquid cooling systems may also be utilized.

In other aspects, the light source 20 may also include an infrared bulb or an ultraviolet bulb. For example, the light source 20 may include an infrared bulb allowing the wireless headlight 10 to be used for night vision during low light operations, activities, or processes. In another example, the light source 20 may include an ultraviolet bulb for illuminating target 15. The light source 20 may also be supplied by an optic cable 38 (see FIG. 3) affixed to an illumination apparatus, light source 20, or the light housing 14. The optic cable 38 may supply light or other illumination from a source in the immediate area of the user. The lumens or output communicated by the light source 20 may be adjusted utilizing one or more physical controls or user interface (e.g., verbal/audio input, gesture inputs, tactile inputs, etc.). In one aspect, an input from user 13 to wireless earpieces 50 is communicated to and processed by a logic controller 42 within the light housing 14 for controlling the brightness of light source 20 illuminating target 15.

A protective cover lens 22 may enclose the aperture 16 to protect the light source and internal components of the wireless headlight 10 by operation of electronic actuator(s) 21. The protective cover lens 22 may be adjustable using one or more voice or touch commands and may work in tandem with the positioning of the light source 20 for adjusting the range of the light source 20. In addition, the protective cover lens 22 may include a front reflector 23 for reflecting a portion of the illumination 17 from the light source 20 back to the source for additive/reflective illumination. In one aspect, an input 9 from user 13 to wireless earpieces 50 is communicated from wireless earpieces 50 to and processed by a logic controller 42 within the light housing 14 for controlling operation of electronic actuator(s) 21.

An electronic actuator 24 is operably connected to the light housing 14 and may be used to change the direction of the light source 20 around vertically or horizontally relative to the wireless headband 12 or target 15. The electronic actuator 24 may also allow for rotation or pivoting in any number of directions. In one embodiment, the electronic actuator 24 may include an electrical motor or actuators with gears, teeth, a pivotable hub, a track or guiderails that light housing 14 is configured to move or be position by electronic actuator 24. For example, the user 13 may issue a voice command received by a microphone 61 of the wireless earpieces 50, such as "move up five degrees," in which a signal from the wireless earpieces 50 is sent from transceiver 62 to transceiver 44, processed by logic controller 42, which executes an algorithm or application to command the electronic actuator 24 to move the light housing 14 upward five degrees. In another aspect, the light housing 14 may be attached with gears, teeth, a pivotable hub, a track or guiderails for physically moving portions of the wireless headlight 10 including the light housing 14 by user input 9 to the wireless earpieces 50 communicated to wireless transceiver 44 and executed by logic controller 42 via electronic actuator 24.

Furthermore, the electronic actuator 24 may be used to control the direction of the light source 20. For example, the user may issue a voice command such as "pan right." The voice command may be captured by microphone 28 interpreted in accordance with an algorithm or application executed by the logic controller 42 disposed within the light housing 14 to move the light source 20. The direction of focus of the light source 20 may be subsequently changed by moving the position of the light source 20 via the electronic actuator 24 in the requested direction.

In one aspect, an input from user 13 to wireless earpieces 50 is communicated from wireless earpieces 50 to and processed by a logic controller 42 within the light housing 14 for controlling direction of movement of electronic actuator 24 relative to the wireless headband 12 or target 15. The camera 41 of the wireless headlight can be used to track illumination 17 of a target 15. For example, an image captured by camera 41 can be tracked by user input 9 to the wireless earpieces 50. The logic controller 42 can operate electronic actuator 24 to track a target 15 with illumination 17 from the light source 20 using feedback from camera 41 processed by the logic controller 42. Tracking can be accomplished by user 13 input 9 controlling movement of light source 20 or by logic controller 42 tracking information from camera 41, comparing it to the location of illumination 17 and making corrections with electronic actuators 21, 24, 25 to move light source 20 so illumination 17 hits the intended target 15.

The wireless headlight 10 can include multiple sensors 26 integrated with the wireless headlight 10, as best illustrated in FIG. 1, and may be configured for receiving input from the user or a third party for operating the wireless headlight 10. In one aspect, one of the sensors 26 may be a microphone 28 for receiving verbal commands. Another sensor 26 may be a motion sensor 30 such as an accelerometer for sensing head gestures of the user. For example, the user may nod their head, which is sensed by the motion sensor 30, to turn on the light source 20 and subsequently issue a verbal command such as "increase brightness," which is sensed by the microphone 28 to increase the power to the light source 20 to adjust the brightness. The commands are interpreted in accordance with one or more algorithms or applications executed by the logic controller 42 disposed within the light housing 14. In one aspect, an input 9 from user 13 to wireless earpieces 50 is communicated from wireless earpieces 50 to and processed by a logic controller 42 within the light housing 14 for controlling these same features of the wireless headlight 10.

Furthermore, one of the sensors 26 of the wireless headlight 10 can be a user interface 32 for receiving input or sensing gestures by the user 13, as best shown in FIG. 1. For example, the user interface 32 may be configured to sense taps, touches, swipes, or other user actions from the user to access a menu for selecting one or more options related to operating the wireless headlight 10 or the light source 20. The user actions are interpreted in accordance with an algorithm or application executed by the logic controller 42 disposed within the light housing 14. The logic controller 42 may subsequently instruct a speaker 34 to audibly communicate the menu to the user in response to the user action. The user may make a selection using the user interface 32, a voice command sensed by the microphone 28, or a head motion sensed by the motion sensor 30.

The user interface 32 may also include one or more tactile buttons, which may be physical or digital, for operating the wireless headlight 10. One button may be utilized to power-on one or more of the light sources 20. For example, a first button may activate a white LED, a second button may activate a red light, blue light, or ultraviolet light based on the amount of time the second button is held. For example, the user may use a left button and an up button to adjust the focus (e.g., narrow beam, broad beam). One or more buttons on the user interface 32 may also be used to control the brightness of the light source 20 or to focus or widen the beam projected by the light source 20.

In one aspect, the wireless headlight 10 may utilize logic to focus on a specified target 15, such as a body feature, marker, beacon, or so forth. For example, a medical token may be placed adjacent a surgery site to keep the light source 20 focused adjacent the token regardless of the motion of the user's head or neck. For example, the token may include an image, color, or shape that is recognized by camera 41 capturing images for the wireless headlight. As a result, the wireless headlight 10 may refocus or move to stay focused on the area in question to the extent possible, such as by operation of one or more of the electronic actuators 21, 24, 25. The wireless headlight 10 may reset to a default position if the token is no longer visible. The wireless headlight 10 may be trained to focus on specific body parts (e.g., face, navel, designated surgery site, etc.) using feedback to the logic controller 42 from camera 41. In one aspect, an input 9 from user 13 to wireless earpieces 50 is communicated from wireless earpieces 50 to and processed by a logic controller 42 within the light housing 14 for controlling these same features of the wireless headlight 10.

The wireless headlight 10 can include a second hinge 36 that couples the light housing 14 to the headband 12 via an electronic actuator 37 to allow for the light housing 14 to be repositioned while the user is wearing the wireless headlight 10. The electronic actuator 37 may be expanded or contracted. For example, the electronic actuator 37 may allow the light housing 14 to dock or connect with other portions of the body of the wireless headlight 10. For example, magnets may be utilized to secure the light housing 14 to other portions of the wireless headlight 10 when not needed in an expanded mode. In one aspect, an input 9 from user 13 to wireless earpieces 50 is communicated from wireless earpieces 50 to and processed by a logic controller 42 within the light housing 14 for controlling operation of electronic actuator 37.

The hinge 36 may also include additional mechanisms for permitting movement in additional directions. As previously noted, the hinges of the illustrative aspects may be connected to electronic actuator 37, such as an electrical motor, control device, pneumatic controls, magnetic controls, or so forth. As a result, the hinges may extend, retract, pivot, or rotate based on control signals received or processed. The hinge 36 may reposition the light housing 14 via a verbal command received at the microphone 28, a head movement sensed by the motion sensor 30, or a manual command provided to the user interface 32 by the user or another third party and interpreted by the logic controller 42. In another aspect, an input 9, such as verbal command or head movement, from user 13 to wireless earpieces 50 can be communicated from wireless earpieces 50 to and processed by a logic controller 42 within the light housing 14 for controlling these and other operations of the wireless headlight 10. For example, the user 13, who may be a surgeon or other medical professional, may state, "move left three centimeters" or "down 2 inches," in which case the logic controller 42 may execute a program or application that sends control signals to move the light housing 14 via the hinge 36 and electronic actuator 37 in accordance with the directions provided by the surgeon or medical professional to reposition the light housing 14 to better illuminate the target 15 site.

In addition, a verbal command provided by the user may consist of directions to move the light housing 14 in two or more directions at once. For example, the user may state "move up two inches and right two and a half inches," in which case the microphone 28 receives the verbal command and communicates the command to the logic controller 42. The logic controller 42 then executes one or more algorithms or applications to instruct the electronic actuator 37 to move second hinge 36 to move the light housing 2 inches upward and two and a half inches rightward in accordance with the user's verbal command. For example, one or more other electronic actuators (or other drivers) attached to the electronic actuator 37, hinge 36 or light housing 14 may move, pivot, or rotate the light housing 14.

In addition, the user may use different commands to move the light housing 14. For example, the user may state, "move 2.5 inches northwest at 30 degrees," which is received by the microphone 28 and communicated to the logic controller 42. The logic controller 42 may then execute a program or application in response to the voice command to move the light housing 14 via the electronic actuator 37 and second hinge 36 approximately 2.5 inches at a 30-degree angle between a leftward (westward) line (relative to the direction the user is facing when wearing the wireless headlight 10) and the line created from the movement of the light housing from its original position to its new position. In another aspect, an input 9, from user 13 to wireless earpieces 50 can be communicated from wireless earpieces 50 to and processed by a logic controller 42 within the light housing 14 for controlling movement of the light housing 14 with user commands.

Furthermore, the reference point may be a northward (upward) direction, similar to the standards of the military.

If the user or a third party wishes to move the light housing 14 in a "south-west" direction (relative to the direction the user is facing when wearing the wireless headlight 10), the user or a third party may state "move south 25 degrees west one-half inch" or, alternatively, the user issue a voice command such as "move 205 degrees one half-inch." Each voice command may be subsequently received by the microphone 28 or and communicated to the logic controller 42, which then executes an application in response to the voice command to move the light housing 14 in accordance with the instructions of the voice command. This same input 9 from user 13 to wireless earpieces 50 can be communicated from wireless earpieces 50 to and processed by a logic controller 42 within the light housing 14 for controlling these and other operations of the wireless headlight 10.

The user may also simultaneously move the light housing 14 using both the electronic actuator 24 and the second hinge 36. For example, the user may use the user interface 32 to move the light housing 14 three inches downward via the second hinge 36 by pressing the down button, hit another button on the user interface 32 to switch to the electronic actuator 24, and then press the up button to rotate the light housing upward via the electronic actuator 24. Verbal commands provided to the microphone 28 may be used in lieu of the user interface, and a nod or shaking of the user's head sensed by the motion sensor 30 may be used to switch between movement modes.

This same input 9 from user 13 to wireless earpieces 50 can be communicated from wireless earpieces 50 to transceiver 44 and processed by a logic controller 42 within the light housing 14 for controlling these and other operations of the wireless headlight 10. Finally, the user may manually adjust the light housing 14 to the desired position by activating a manual mode using a verbal command sensed by the microphone 28, a gesture sensed by the motion sensor 30, or the user interface 32. As a result, the user may manually position the light housing at a desired position, angle, or so forth.

An optic cable 38 may be operatively connected to the light source 20 for providing power or light to the light source 20. The optic cable 38 may supply power from another part of the wireless headlight 10 or may supply power from a third-party source. For example, the optic cable 38 may be part of a surgical setup or health care setting and may be attached to the wireless headlight 10 via a suitable location on the headband 12, the light housing 14, or the light source 20 itself. The optical cable 38 may also communicate a light signal that may be emitted from the light housing 14. For example, the base of the wireless headlight 10 may include an illumination source, such as one or more LEDs, that may be communicated through a reflective portion of the optic cable 38 (e.g., fiber-optic, reflective media, etc.).

Furthermore, the optic cable 38 or light housing 14 may have one or more accelerometers 40 for sensing head movements of the user. For example, an accelerometer 40 built into the cable may be used for controlling the illumination provided by the light source 20. If a surgeon makes a head gesture suggestive of wanting more illumination, the accelerometer 40 may sense this motion and transmit a signal encoding the result to either the logic controller 42 of the wireless headlight 10 or another device associated with the surgeon. The accelerometers 40 may also represent any number of gyroscopes, magnetometers, global positioning systems, or other sensors for detecting the position, location, and orientation of the light housing 14 as well as the user. Similarly, one of the sensors 64 housed within the wireless earpieces 50 can be an accelerometer whereby gestural input 9 from user 13 to wireless earpieces 50 can be communicated from wireless earpieces 50 to and processed by a logic controller 42 within the light housing 14 for controlling these and other operations of the wireless headlight 10.

A camera 41 may be operatively connected to the logic controller 42 and may be positioned adjacent to the aperture 16 on the light housing 14 for capturing images or video in front of the wireless headlight 10. The camera 41 may be adjusted to capture images or video from other areas if desired by the user or another third party. Images and video captured by the camera 41, along with audio captured by microphone 28 may be stored in a memory associated with the logic controller 42 or encoded and transmitted via a wireless transceiver 44 to an external electronic device, such as wireless earpieces 50, wireless device, personal computer, or a wireless dongle. For example, images of a person's internal organs during surgery captured by the camera 41 may be transmitted to wireless earpieces 50 for portable storage within memory 63. Videos may be captured, transmitted, and stored similarly.

FIGS. 1-5 illustrate electronic and electromechanical components of the wireless headlight 10 in accordance with one or more illustrative aspects. In one aspect, the logic controller 42 is disposed within the light housing 14 and is operatively connected to each of the electronic components of the wireless headlight 10. In another embodiment, the logic controller 42 may be encompassed in a housing, frame, or body of the wireless headlight 10. The logic controller 42 of the wireless headlight 10 and the processor 60 of the wireless headphones 50 may be a digital integrated circuit, an analog integrated circuit, a mixed integrated circuit, an application-specific integrated circuit, an intelligent control unit, a central processing unit, processor, or another type of component capable of processing data and/or information, and more than one of the aforementioned types may be integrated together.

The logic controller 42 may include logic circuitry, which may include combinational and/or sequential digital logic, for controlling one or more functions of the wireless headlight 10. The logic controller 42 may also include a register with data and/or instructions stored thereon for controlling the wireless headlight 10. In addition, data and/or information stored in one or more memories 48 within the logic controller 42 may be used by the logic circuitry to enhance the functionality of the wireless headlight 10. Similarly, the processor 60 in the wireless headphones can include logic circuitry, which may include combinational and/or sequential digital logic, for controlling one or more functions of the wireless headlight 10. Processor 60 may also include a register with data and/or instructions stored thereon for controlling the wireless headlight 10. In addition, data and/or information stored in one or more memories 63 within the processor 60 may be used by the logic circuitry to enhance the functionality of the wireless headlight 10.

The logic controller 42 of the wireless headlight 10 is also programmed to associate commands with one or more actions provided by the user or a third party. The logic controller 42 may use one or more programs, applications or algorithms stored within a memory 48 or within one of the components (such as the register) of the logic controller 42 to associate a command with an action. For example, the pressing of a left button on the user interface 32 by the user provides a program executable by the logic controller 42 with data that the user wishes to move the light housing 14 to the left relative to the direction the user (who is wearing the wireless headlight 10) is facing. Depending on the mode, the user may wish to move the light housing to the left via the hinge 36 or rotate the light housing along its z-axis to the left via the electronic actuator 24. The logic controller 42 may also associate a voice or verbal action, tactile feedback, head gesture, or other input with a command as well. For example, if the user says, "move 135 degrees 5 centimeters," the logic controller 42 may execute one or more programs for moving the light housing 14 to the southeast 45 degrees from the perspective of the user. The processor 60 of wireless earpieces 50 can be programmed to perform these same functions and operations at the wireless headlight 10 based on input 9 from user 13 to the wireless earpieces 50. User input can include, but is not limited to, a voice or verbal action, tactile feedback, head gesture, or other input with a command as well.

The logic controller 42 may also learn to associate commands with user actions in which data or information is either absent or insufficient to establish a nexus between an action and a command. For example, if the user continuously taps on the protective lens 22 and subsequently moves forward before issuing a command to increase brightness, the logic controller 42 may store information in a memory or another part of the intelligent control system 22 which associates the combination of user actions with a command to increase the brightness of the light source 20. Thus, the next time the user performs similar actions, the brightness of the light source 20 may increase automatically. In a similar manner, processor 60 of wireless earpieces can be programmed to learn to associate input 9 from user 13 with commands in which data or information is absent or insufficient to establish a nexus between input 9 and a command. For example, if the user continuously taps on user interface 33 of one or more of wireless earpieces 50 and subsequently moves forward before issuing a command to increase brightness, the processor 60 may store information in a memory 63 or another part of the processor 60 which associates the combination of user input 9 with a command to increase the brightness of the light source 20. Thus, the next time the user performs similar actions, the brightness of the light source 20 may increase automatically.

Additionally, commands such as adjusting the positioning of the light housing 14, adjusting the focus of the light source 20, adjusting the positioning of the parabolic reflector 18, adjusting the brightness or intensity of the light source 20, or adjusting or modifying one or more programs within the logic controller 42 may be associated with one or more user or third-party actions. For example, if the user says "throw" and afterwards states "focus beam," the logic controller 42 may associate the term "throw" with focusing the light source 20.

The wireless transceiver 44 may be operatively connected to the logic controller 42 and may be configured to transmit signals encoding first data to and receive signals encoding second data from a wireless device. The wireless transceiver 44 may be a Bluetooth transceiver, a Wi-Fi transceiver, a WiMAX transceiver, or another type or class of wireless transceiver that can simultaneously receive signals from electronic devices at substantial distances and meet one or more IEEE standards. The wireless transceiver 44 may also be a near-field magnetic induction (NFMI) transceiver for sending short range signals to another electronic device, such as the wireless earpieces 50. The signals transmitted by the wireless transceiver 44 may be derived from information communicated by the user or a third party, sound, audio, or voice commands received by the microphone 28, head gestures sensed by the motion sensor 30, input received at the user interface 32, images or video captured by the camera 41, and/or data stored in a memory of the logic controller 42. The wireless transceiver 62 of wireless headphones 50 may be operatively connected to the processor 60 and may be configured to transmit signals encoding first data to and receive signals encoding second data from a wireless device. The wireless transceiver 62 may be a Bluetooth transceiver, a Wi-Fi transceiver, a WiMAX transceiver, or another type or class of wireless transceiver that can simultaneously receive signals from electronic devices at substantial distances and meet one or more IEEE standards. The wireless transceiver 62 may also be a near-field magnetic induction (NFMI) transceiver for sending short range signals to another electronic device, such as the wireless headlight 10. The signals transmitted by the wireless transceiver 62 may be derived from input 9 from user 13 using sound, audio, or voice commands received by the microphone 61, head gestures sensed by one of the earpiece sensors 64, input received at the user interface 33, and/or data stored in a memory 63 of the processor 60.

Energy source 46 of wireless headlight 10 is operatively connected to all the electronic and electromechanical components within the wireless headlight 10 and disposed within the light housing 14. The energy source 46 may provide enough power to operate the components of the wireless headlight 10 for a reasonable duration of time. The energy source 46 may be of any type suitable for powering the wireless headlight 10. In one embodiment, the energy source 46 is a lithium ion battery. However, the energy source 46 need not be present in the wireless headlight 10. In another embodiment, the energy source 46 may represent a solar cell, piezo electric generator, ultra-capacitor, fuel cell, thermal generator, chemical reaction device, or so forth. Alternative battery-less power sources, such as sensors configured to receive energy from radio waves may be used to power the wireless headlight 10 in lieu of an energy source 46. In a one aspect, the energy source 46 is rechargeable. Energy source 57 of wireless earpieces 50 is operatively connected to all the electronic and electromechanical components within the wireless earpieces 50 and disposed within the earpiece housing 51. The energy source 57 may provide enough power to operate the components of the wireless earpieces 50 for a reasonable duration of time. In one aspect, the energy source 57 is a lithium ion battery. In a one aspect, the energy source 46 is rechargeable.

The speaker 34 of wireless headlight 10 may audibly communicate information to the wearer of the wireless headlight 10. In one aspect, the speaker 34 may be miniaturized and may confirm information regarding lumens/brightness, color spectra being output, direction, orientation, or position, user identification, activated features or processes, or so forth. The speaker 34 may include multiple speakers, such as a tweeter, mid-range, and bass in a miniaturized format for integration in the wireless headlight 10. The speaker 59 of wireless headphones 50 may audibly communicate information to user 13 wearing the wireless earpieces 50 in-ear. In one aspect, the speaker 59 may be miniaturized and may confirm information regarding lumens/brightness, color spectra being output, direction, orientation, or position, user identification, activated features or processes, or so forth of the wireless headlight 10. The speaker 59 may include multiple speakers, such as a tweeter, mid-range, and bass in a miniaturized format for integration in the wireless earpieces 50.

The microphone 28 of the wireless headlight 10 may include one or more microphones for receiving audible commands. The microphone 28 may also sense environmental noises, sounds, or audio as well that may be utilized to control the wireless headlight 10. The memory 48 may be a static or dynamic storage medium, such as static random-access memory, flash memory, or dynamic random-access memory. However, the memory 48 may be a hard disk, read-only memory, or other suitable form or combination of volatile or nonvolatile memory. The memory 48 may store user preferences, data, information, applications, and instructions for execution by the intelligent control 42 to control the illumination functions implemented by the wireless headlight 10. The microphone 61 of the wireless earpieces 50 may include one or more microphones for receiving audible input 9 from user 13 while worn in-ear by user 13. The microphone 61 may also sense environmental noises, sounds, or audio as well that may be utilized to control the wireless headlight 10. The memory 63 may be a static or dynamic storage medium, such as static random-access memory, flash memory, or dynamic random-access memory. The memory 63 may store user preferences, data, information, applications, and instructions for execution by the intelligent control processor 60 to control the illumination functions implemented by the wireless headlight 10.

The motion sensor 30 of the wireless headlight 10 may detect motion of the wireless headlight 10 as well as motion in front of the wireless headlight 10. In one aspect, the wireless headlight 10 may be utilized to dynamically track a target 15, such as an identified object, person, operation site, token, beacon, or so forth. For example, target 15 such as a token may be positioned adjacent an operation site to ensure that the operation site is illuminated regardless of the motion of the wireless headlight on the user's head. One or more of electronic actuators 21, 24, 25 may dynamically position the light source of the wireless headlight 10 to focus on the token or adjacent the token. The wireless earpieces 50 include sensors 64, such as a motion sensor, to detect motion of the wireless earpieces 50. In one aspect, using feedback from wireless headlight 10 in the form of audio via speaker 59, the wireless earpieces 50 may be utilized to dynamically track a target 15, such as an identified object, person, operation site, token, beacon, or so forth. For example, target 15 such as a token may be positioned adjacent an operation site to ensure that the operation site is illuminated regardless of the motion of the wireless headlight on the user's head. One or more of electronic actuators 21, 24, 25 may dynamically position the light source of the wireless headlight 10 to focus on the token or adjacent the token.

FIGS. 1-5 also illustrate the relationship between the wireless headlight 10 and other electronic components with which the wireless headlight 10 may interact in accordance with an illustrative aspect. In one aspect, wireless earpiece 50 may be worn in-ear by user 13 and capable of communicating with or receiving communications from the wireless headlight 10. The wireless earpieces 50 may include an earpiece housing 51, a processor 60 disposed within the earpiece housing 51, a wireless transceiver 62 operatively connected to the processor 60 and capable of communicating with the wireless headlight 10, and one or more earpiece sensors 64 operatively connected to the processor 60. Other components, such as a microphone 61 and a speaker 59, may be operatively connected to the processor 60 of the wireless earpieces 50 as well.

In one embodiment, the earpiece sensors 64 of the wireless earpiece 50 may include one or more inertial sensors, accelerometers, gyroscopes, or magnetometers capable of sensing head movement of user 13 which may be used by the wireless headlight 10 for controlling the light housing 14, brightness of light source 20, operation of electronic actuators 21, 24, 25 or another component. For example, a downward shake of the user's head may be sensed by the inertial sensors 64 of the wireless earpiece 50 and communicated via the wireless transceiver 62 of the wireless earpiece 50 to the logic controller 42 of the wireless headlight 10, which may interpret the information to mean a downward motion of the light housing 14. The motion may be a few centimeters, a few inches, or a greater distance. Alternatively, the processor 60 may associate the downward shake of the user's head with a command to move the light housing 14 downward before instructing the wireless transceiver 62 to transmit a signal encoding the command to the wireless transceiver 44 of wireless headlight 10.

Furthermore, voice commands or other commands capable of being received by a microphone 61 the wireless earpieces 50 may be used to control the wireless headlight 10. For example, the user 13 may issue an input 9 in the form of a voice command sensed by microphone 61 to rotate the light housing 14 downward along its y-axis, which may be encoded by the processor 60 of the wireless earpiece 50 and communicated to the logic controller 42 of the wireless headlight 10, which may subsequently execute the command operating one or more of the electronic actuators 21, 24, 25. Hand gestures or tactile input (e.g., finger taps, swipes, etc.) sensed by a user interface 65 on one or more of the wireless earpieces 50 may also be used to control the wireless headlight 10. In one aspect, the wireless headlight 10 is not equipped with sensors and a microphone given that these sensors are integrated with the wireless earpieces 50. For example, wireless headlight may not include accelerometers and microphones when utilized with wireless earpieces 50 that include at least one sensor for measuring movement and one for acquiring sound.

Information captured or obtained by the wireless headlight 10 may also be transmitted to the wireless earpiece 50 and provided to user 13 via speaker 59, or another electronic device for analysis or other uses. For example, the wireless headlight 10 may transmit one or more signals encoding images or video captured by the camera 41 which may be used to make a medical diagnosis. The video captured by the camera 41 may include video taken during a surgery or an autopsy (e.g. internal body cavities, internal organs, bruises, cuts, etc.), video taken during a dental examination, video taken during an interview, or video taken during another medical related procedure. Sound may also be captured by the microphone 28 contemporaneously with the capturing of the video. For example, a medical professional may annotate a surgery or autopsy while capturing the video. Data stored within a memory 48 of the logic controller 42, such as programs, applications, algorithms, instructions, or other types of information, may also be transmitted to the wireless earpiece 50 or another electronic device.

A wireless dongle 52 may be operatively connected to a computer or another electronic device 54 and capable of receiving and transmitting signals encoding instructions for the wireless headlight 10. For example, if the user, who may be a medical professional, issues a voice command to "move one inch to the right and one inch up and increase brightness twenty percent," the voice command may be received by the electronic device 54 in which the wireless dongle 52 is connected and processed by one or more processing units of the electronic device 54. The processing units of the electronic device 54 may subsequently instruct the wireless dongle 52 to transmit a signal encoding instructions to move the light housing 14 and increase the brightness of the light source 20 in accordance with the instructions provided.

In addition, the wireless dongle 52 may receive signals from the wireless headlight 10. For example, if the user uses the camera 41 to capture images or video of a patient's internal organs during surgery, the images and video may be encoded in one or more signals and transmitted by the wireless transceiver 44 to the wireless dongle 52, which may be inserted into or otherwise connected to the electronic device 54. Furthermore, the images and video may be transmitted by the wireless transceiver 44 to a switch 56 connected to other electronic devices in the immediate area or the images and video may be transmitted by the wireless transceiver 44 to a router 58, which may subsequently transmit the images or video to another third-party destination.

As previously noted, the wireless earpieces 10 may have a unibody framework that allows the light source to pivot, rotate, change wavelength, adjust brightness, or so forth. In other embodiments, the wireless earpieces 10 may utilize one or more hinges, linkages, and motors to position the light source for utilization. The wireless earpieces or other wireless devices may be associated with the wireless headlight utilizing a signal, connection (e.g., Bluetooth pairing, WiFi connection, etc.), physical connection (e.g., magnetically connected wire), or so forth. A learning process may also be utilized between the wireless earpieces and wireless headlight to associated user actions and commands with control signals that are sent from the wireless earpieces to the wireless headlight.

What is claimed is:

1. A wireless earpiece controlled wearable headlight comprising:
   a configurable headband for fitting to a head of a user;
   a light source and a battery operably attached to the headband;
   a logic controller attached to the headband and operably connected to the light source for automated control of the light source powered by the battery;
   a wireless transceiver attached to the headband and operatively connected to the logic controller;
   a wireless earpiece with a processor, a second wireless transceiver operatively connected to the processor, and at least one sensor operatively connected to the processor, wherein the wireless earpiece is worn in-ear by the user and the at least one sensor receives an input from the user at the wireless earpiece; and
   wherein the user input to the wireless earpiece is communicated to and processed by the logic controller for controlling the light source on the headband.

2. The wireless headlight of claim 1, further comprising:
   an electronic actuator operably attached to the light source and the headband, the electronic actuator configured for automated positioning of the light source relative to the headband to control direction of the light emitted from the light by control of the user input to the wireless earpiece.

3. The wireless headlight of claim 1, wherein the user input to the wireless earpieces is received at the logic controller to control light intensity emitted from the light source.

4. The wireless headlight of claim 2, wherein the user input to the wireless earpiece is communicated to the wireless transceiver and processed by the logic controller for controlling the actuator and light intensity emitted from the light source.

5. The wireless headlight of claim 1, further comprising:
   a parabolic reflector disposed about the light source and an electronic actuator operably attached to the parabolic reflector and the headband and under operable control by the logic controller for controlling a focal point of light emitted from the light source by control of the user input to the wireless earpiece.

6. The wireless headlight of claim 1, further comprising:
   a parabolic reflector disposed about the light source and an actuator operably attached to the light and the headband and under operable control by the logic controller for controlling a focal point of light emitted from the light source by control of the user input to the wireless earpiece.

7. A wireless earpiece controlled wearable headlight system, comprising:
   a wireless headlight, wherein the wireless headlight comprises:
      a configurable headband for fitting to a head of a user;
      a light housing adjustably coupled to the headband and positioned proximate to a front side of the headband;
      a first processor and a battery disposed within the light housing;
      a first wireless transceiver operatively connected to the first processor;
      a light source disposed within the light housing and powered by the battery; and
      at least one electronic actuator operably connected to the headband and the light housing to articulate the light housing relative to the headband and control direction of light emitted from the light source; and
   a wireless earpiece, wherein the wireless earpiece comprises:
      an earpiece housing configured to be worn in-ear by the user;
      a second processor disposed within the earpiece housing;
      a second wireless transceiver disposed with the earpiece housing and operatively connected to the second processor; and
      an earpiece sensor operatively connected to the processor, wherein the earpiece sensor is configured for sensing an input by the user;
   wherein the user input to the wireless earpiece is communicated to and processed by the first processor for controlling the light on the headband.

8. The system of claim 7, further comprising:
   a swivel joint operably coupled between the headband and light housing whereby the light housing articulates about the swivel joint relative to the headband.

9. The system of claim 7, further comprising:
   a first and a second electronic actuator of the at least one electronic actuator, the first and second electronic actuator operably attached to the light housing and headband to control movement of the light housing in an xy plane and an xz plane by control of the user input to the wireless earpiece.

10. The system of claim 7, further comprising:
    an illumination control circuit of the first processor for controlling brightness of light emitted from the light source by control of the user input to the wireless earpiece.

11. The system of claim 7, further comprising:
    an electronic focal actuator operably attached to a parabolic reflector disposed about the light source, the focal actuator controlling position of the parabolic reflector relative to the light source by control of the user input to the wireless earpiece.

12. The system of claim 7, further comprising:
    a plurality of sensors operably connected to the first processor on the configurable headband, the plurality of sensors comprising a microphone, a user interface, an optical sensor, and a motion sensor.

13. The system of claim 7, further comprising:
a camera operably connected to the first processor and disposed at the light housing to capture images by user input to the wireless earpiece.

14. The system of claim 7, wherein the user input includes control signals from the wireless earpiece to control direction of illumination of the light source, one or more light sources utilized, focal point of the light source, and brightness of the light sources.

15. A method for utilizing a wearable headlight with wireless earpieces, comprising:
associating the wireless headlight worn by a user with wireless earpieces;
receiving user input from the user utilizing one or more sensors of the wireless earpieces;
communicating the user input to the wireless headlight;
adjusting an angle of illumination provided by the wireless headlight in response to user input from the user; and
adjusting the brightness of the light source utilized by the wireless headlight in response to the user input.

16. The method of claim 15, further comprising:
changing the light sources utilized to provide illumination in response to the user input to the wireless earpieces.

17. The method of claim 15, further comprising:
focusing the light source on a target identified by the wireless headlight.

18. The method of claim 17, wherein the target is a selected image.

19. The method of claim 17, wherein the target is a token identifiable by the wireless headlight.

20. The method of claim 15, wherein the user input is one or more of an audio command, a tactile command, or a gesture sensed by the one or more sensors of the wireless earpieces.

* * * * *